(12) United States Patent
Garvey et al.

(10) Patent No.: US 10,248,561 B2
(45) Date of Patent: Apr. 2, 2019

(54) STATELESS DETECTION OF OUT-OF-MEMORY EVENTS IN VIRTUAL MACHINES

(71) Applicant: Oracle International Corporation, Redwood City, CA (US)

(72) Inventors: Dustin R. Garvey, Oakland, CA (US); Sampanna S. Salunke, San Carlos, CA (US); Lik Wong, Palo Alto, CA (US); Xuemei Gao, Pleasanton, CA (US); Yongqiang Zhang, Acton, MA (US); Eric S. Chan, Fremont, CA (US); Kenny C. Gross, Escondido, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 579 days.

(21) Appl. No.: 14/743,817

(22) Filed: Jun. 18, 2015

(65) Prior Publication Data

US 2016/0371181 A1    Dec. 22, 2016

(51) Int. Cl.
*G06F 17/30* (2006.01)
*G06F 12/02* (2006.01)
*G06F 3/06* (2006.01)

(52) U.S. Cl.
CPC ........ *G06F 12/0253* (2013.01); *G06F 3/0619* (2013.01); *G06F 3/0653* (2013.01); *G06F 3/0671* (2013.01)

(58) Field of Classification Search
CPC .............. G06F 11/1484; G06F 11/301; G06F 11/3432; G06F 11/3447; G06F 11/3037; G06F 11/073

(Continued)

(56) References Cited

U.S. PATENT DOCUMENTS

| 6,167,535 A | 12/2000 | Foote et al. |
| 6,968,557 B1 | 11/2005 | Zhang et al. |

(Continued)

FOREIGN PATENT DOCUMENTS

| CN | 201000563 | 1/2008 |
| CN | 101263499 | 9/2008 |

(Continued)

OTHER PUBLICATIONS

Chinese Application No. 201480020584.7, Office Action dated May 8, 2017, 13 pages (6 pages for the original document and 7 pages for the English Translation).

(Continued)

*Primary Examiner* — Monica M Pyo
(74) *Attorney, Agent, or Firm* — Kilpatrick Townsend & Stockton, LLP

(57) ABSTRACT

The disclosed embodiments provide a system that detects anomalous events in a virtual machine. During operation, the system obtains time-series garbage-collection (GC) data collected during execution of a virtual machine in a computer system. Next, the system generates one or more seasonal features from the time-series GC data. The system then uses a sequential-analysis technique to analyze the time-series GC data and the one or more seasonal features for an anomaly in the GC activity of the virtual machine. Finally, the system stores an indication of a potential out-of-memory (OOM) event for the virtual machine based at least in part on identifying the anomaly in the GC activity of the virtual machine.

20 Claims, 11 Drawing Sheets

(58) Field of Classification Search
USPC .......................................... 707/813; 711/132
See application file for complete search history.

(56) References Cited

U.S. PATENT DOCUMENTS

| | | | |
|---|---|---|---|
| 7,100,079 | B2 | 8/2006 | Gross et al. |
| 7,257,657 | B2 | 8/2007 | DeWitt, Jr. et al. |
| 7,526,682 | B1 | 4/2009 | Chacko et al. |
| 7,685,575 | B1 | 3/2010 | Fareed |
| 7,703,087 | B1 | 4/2010 | Prakash |
| 7,779,054 | B1 | 8/2010 | Printezis et al. |
| 7,962,437 | B2 | 6/2011 | Brandenburg et al. |
| 7,991,961 | B1 | 8/2011 | Tsai et al. |
| 8,156,378 | B1 | 4/2012 | Suit |
| 8,185,781 | B2 | 5/2012 | Chen et al. |
| 8,266,190 | B2 | 9/2012 | Johnson |
| 8,464,255 | B2 | 6/2013 | Nathuji et al. |
| 8,719,791 | B1 | 5/2014 | MacPherson et al. |
| 8,775,769 | B2 | 7/2014 | Li et al. |
| 8,832,490 | B2 | 9/2014 | Malnati |
| 8,978,022 | B2 | 3/2015 | Kalogeropulos et al. |
| 9,104,563 | B2 | 8/2015 | Taskov |
| 9,122,602 | B1 | 9/2015 | Jewell et al. |
| 9,146,862 | B2 | 9/2015 | Bobroff et al. |
| 9,210,181 | B1 | 12/2015 | Nandy et al. |
| 9,330,119 | B2 | 5/2016 | Chan et al. |
| 9,471,225 | B2 | 10/2016 | Bobroff et al. |
| 9,495,395 | B2 | 11/2016 | Chan et al. |
| 9,692,662 | B2 | 6/2017 | Chan et al. |
| 2001/0044856 | A1 | 11/2001 | Agesen et al. |
| 2003/0005414 | A1 | 1/2003 | Elliott et al. |
| 2003/0028741 | A1 | 2/2003 | Sokolov et al. |
| 2003/0097617 | A1 | 5/2003 | Goeller et al. |
| 2004/0193662 | A1 | 9/2004 | Garthwaite |
| 2005/0240641 | A1 | 10/2005 | Kimura et al. |
| 2006/0122965 | A1 | 6/2006 | Adams et al. |
| 2006/0168475 | A1 | 7/2006 | Segers et al. |
| 2006/0173877 | A1 | 8/2006 | Findeisen et al. |
| 2006/0206885 | A1 | 9/2006 | Seidman et al. |
| 2006/0218543 | A1 | 9/2006 | Boger |
| 2006/0230087 | A1 | 10/2006 | Andreasson |
| 2007/0027942 | A1 | 2/2007 | Trotter |
| 2007/0055914 | A1 | 3/2007 | Chandwani et al. |
| 2007/0067758 | A1 | 3/2007 | Findeisen et al. |
| 2007/0136402 | A1* | 6/2007 | Grose ................. G06F 12/0253 |
| 2007/0168915 | A1 | 7/2007 | Fabbio et al. |
| 2007/0220513 | A1 | 9/2007 | Hwang |
| 2007/0234296 | A1 | 10/2007 | Zorn et al. |
| 2008/0148180 | A1 | 6/2008 | Liu et al. |
| 2008/0301501 | A1 | 12/2008 | Grant et al. |
| 2008/0301504 | A1* | 12/2008 | Chen ..................... G06F 11/008 |
| | | | 714/42 |
| 2009/0037687 | A1 | 2/2009 | Li et al. |
| 2009/0070776 | A1 | 3/2009 | Dahlstedt |
| 2009/0083349 | A1 | 3/2009 | Johnson |
| 2009/0106178 | A1 | 4/2009 | Chu |
| 2009/0106603 | A1 | 4/2009 | Dilman et al. |
| 2009/0132457 | A1 | 5/2009 | Brandenburg et al. |
| 2009/0177692 | A1 | 7/2009 | Chagoly et al. |
| 2009/0234899 | A1 | 9/2009 | Kramer |
| 2009/0306920 | A1* | 12/2009 | Zwinger ............ G01R 31/2884 |
| | | | 702/77 |
| 2009/0313508 | A1 | 12/2009 | Yan et al. |
| 2009/0320021 | A1* | 12/2009 | Pan ..................... G06F 11/0715 |
| | | | 718/100 |
| 2010/0094592 | A1 | 4/2010 | Cherkasova et al. |
| 2010/0094992 | A1 | 4/2010 | Cherkasova et al. |
| 2010/0235815 | A1 | 9/2010 | Maybee et al. |
| 2010/0262858 | A1 | 10/2010 | Chen et al. |
| 2010/0318836 | A1 | 12/2010 | Ness et al. |
| 2010/0324869 | A1 | 12/2010 | Cherkasova et al. |
| 2011/0016357 | A1 | 1/2011 | Tsvetkov |
| 2011/0067007 | A1 | 3/2011 | Zamarreno |
| 2011/0107050 | A1 | 5/2011 | Vengerov |
| 2011/0161048 | A1 | 6/2011 | Sodem et al. |
| 2011/0258604 | A1 | 10/2011 | Drukman et al. |
| 2011/0270795 | A1 | 11/2011 | Smith et al. |
| 2011/0283266 | A1 | 11/2011 | Gallagher et al. |
| 2011/0320586 | A1 | 12/2011 | Maltz et al. |
| 2011/0320682 | A1 | 12/2011 | McDougall et al. |
| 2012/0054331 | A1 | 3/2012 | Dagan |
| 2012/0054554 | A1 | 3/2012 | Dagan |
| 2012/0144374 | A1 | 6/2012 | Gallagher et al. |
| 2012/0159449 | A1 | 6/2012 | Arnold et al. |
| 2012/0185732 | A1 | 7/2012 | Sankar et al. |
| 2012/0185735 | A1 | 7/2012 | Sambamurthy et al. |
| 2012/0197626 | A1 | 8/2012 | Kejariwal et al. |
| 2012/0197733 | A1 | 8/2012 | Skomoroch et al. |
| 2013/0013953 | A1 | 1/2013 | Eck et al. |
| 2013/0042154 | A1 | 2/2013 | Agarwal et al. |
| 2013/0132778 | A1 | 5/2013 | Dagan |
| 2013/0204948 | A1 | 8/2013 | Zeyliger et al. |
| 2014/0143759 | A1 | 5/2014 | Neichev et al. |
| 2014/0310235 | A1 | 10/2014 | Chan et al. |
| 2014/0310285 | A1 | 10/2014 | Chan et al. |
| 2014/0310714 | A1 | 10/2014 | Chan et al. |
| 2015/0234869 | A1 | 8/2015 | Chan et al. |
| 2015/0254330 | A1 | 9/2015 | Chan et al. |
| 2016/0371170 | A1 | 12/2016 | Salunke et al. |
| 2016/0371180 | A1 | 12/2016 | Urmanov et al. |
| 2016/0371181 | A1 | 12/2016 | Garvey et al. |
| 2017/0012834 | A1 | 1/2017 | Chan et al. |
| 2017/0052730 | A1 | 2/2017 | Bobroff et al. |

FOREIGN PATENT DOCUMENTS

| | | |
|---|---|---|
| CN | 101630285 | 1/2010 |
| CN | 105144112 | 12/2015 |
| CN | 105190564 | 12/2015 |
| EP | 1696351 A1 | 8/2006 |
| EP | 2984567 | 2/2016 |
| EP | 2984568 B1 | 2/2016 |
| JP | 2007286811 A | 11/2007 |
| JP | 2016517984 A | 6/2016 |
| JP | 2016518660 A | 6/2016 |
| WO | 2014168981 A1 | 10/2014 |
| WO | 2014169056 A1 | 10/2014 |

OTHER PUBLICATIONS

Chinese Application No. 201480020730.6, Office Action dated Jul. 3, 2017, 13 pages (6 pages for the original document and 7 pages for the English translation).

International Patent Application No. PCT/US2014/033385, Notification of Transmittal of the International Search Report and the Written Opinion of the International Searching Authority dated Jul. 17, 2014.

International Patent Application No. PCT/US2014/033385, Written Opinion of the International Preliminary Examining Authority dated Apr. 29, 2014.

International Patent Application No. PCT/US2014/033385, Notification of Transmittal of the International Preliminary Report on Patentability, dated Jul. 17, 2015.

International Patent Application No. PCT/US2014/033530, Notification of Transmittal of the International Search Report and the Written Opinion of the International Searching Authority dated Jul. 17, 2014.

International Patent Application No. PCT/US2014/033530, Written Opinion of the International Preliminary Examining Authority dated Apr. 10, 2015.

International Patent Application No. PCT/US2014/033530, Notification of Transmittal of the International Preliminary Report on Patentability, dated Jul. 13, 2015.

International Patent Application No. PCT/US2016/021642, Notification of Transmittal of the International Search Report and the Written Opinion of the International Searching Authority dated Jun. 6, 2016.

International Patent Application No. PCT/US2016/021642, Notification of Transmittal of the International Preliminary Report on Patentability, dated Jun. 20, 2017.

(56) References Cited

OTHER PUBLICATIONS

International Patent Application No. PCT/US2016/021642, Written Opinion of the International Preliminary Examining Authority dated Mar. 24, 2017.
U.S. Appl. No. 14/109,546, Non-Final Office Action dated Mar. 14, 2016.
U.S. Appl. No. 14/109,546, Final Office Action dated Sep. 21, 2016.
U.S. Appl. No. 14/109,546, Non-Final Office Action dated Feb. 22, 2017.
U.S. Appl. No. 14/109,578, Interview Summary dated Feb. 1, 2016.
U.S. Appl. No. 14/109,578, Notice of Allowance dated Jun. 23, 2016.
U.S. Appl. No. 14/109,651, Non-Final Office Action dated Aug. 25, 2015.
U.S. Appl. No. 14/665,171, Non-Final Office Action dated May 4, 2017.
U.S. Appl. No. 14/665,171, Final Office Action dated Sep. 5, 2017.
U.S. Appl. No. 15/275,035, Notice of Allowance dated Feb. 9, 2017.
U.S. Appl. No. 15/275,035, Corrected Notice of Allowance dated Apr. 11, 2017.
Chan et al.; "Situation aware computing for big data", IEEE International Conference on Big Data, IEEE, Oct. 27, 2014, pp. 1-6.
Gawlick et al. "Fine Grain Provenance Using Temporal Databases", Unisex, May 24, 2011, pp. 1-4.
Gawlick et al.; "Mastering Situation Awareness: The Next Frontier?", 7th Biennial Conference on Innovative Data Systems Research (CIDR '15), Jan. 4-7, 2015, 1 page.
Guerra et al.; "An Integrated Data Management Approach to Manage Health Care Data", Datenbanken und informationssysteme, (DBIS), Jan. 1, 2011, pp. 596-605.
Liu et al.; KIDS—A model for Developing Evolutionary Database Applications, Proceedings of the International Conference on Data Technologies and Applications, Jul. 1, 2012, pp. 129-134.
Peralta et al.; "Probabilistic Error Detection and Diagnosis in Large-Scale Distributed Applications", Dec. 2012, (Peralta_2012.pdf: pp. 1-197).
Wegiel et al.; "Dynamic Prediction of Collection Yield for Managed Runtimes", Association for Computer Machinery 44:289-300 (Mar. 7, 2009).
Hwang et al. "How to Analyze verbosegc trace with IBM Pattern Modeling and Analysis Tool for IBM Java Garbage Collector", downloaded from http://www-01.ibm.com/support/docview.wss?uid=swg27007240&aid=1 on Oct. 25, 2017.
Sun et al.; "Solving Memory Problems in WebSphere Applications", Jun. 27, 2007.
U.S. Appl. No. 14/109,546, Corrected Notice of Allowability dated Nov. 26, 2018, 3 pages.
U.S. Appl. No. 14/109,546, Notice of Allowance dated Sep. 18, 2018, 12 pages.

* cited by examiner

STATELESS DETECTION OF OUT-OF-MEMORY EVENTS IN VIRTUAL MACHINES

RELATED APPLICATIONS

The subject matter of this application is related to the subject matter in a co-pending non-provisional application by inventors Aleksey M. Urmanov, Dustin R. Garvey and Lik Wong, entitled "Free Memory Trending for Detecting Out-of-Memory Events in Virtual Machines," having Ser. No. 14/743,805, and filing date Jun. 18, 2015.

The subject matter of this application is also related to the subject matter in a co-pending non-provisional application by inventors Sampanna S. Salunke, Dustin R. Garvey, Lik Wong and Kenny C. Gross, entitled "Stateful Detection of Anomalous Events in Virtual Machines," having Ser. No. 14/743,847, and filing date Jun. 18, 2015.

BACKGROUND

Field

The disclosed embodiments relate to techniques for monitoring virtual machines. More specifically, the disclosed embodiments relate to techniques for performing stateless detection of out-of-memory events in virtual machines.

Related Art

As electronic commerce becomes more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is important to ensure reliability and/or high availability in such enterprise computing systems.

Not all failures in computer systems are caused by hardware issues. Instead, software aging in enterprise computing systems may result in problems such as hangs, crashes, and reduced performance. Such software aging may be caused by resource contention, memory leaks, accumulation of round-off errors, latching in shared memory pools, and/or other sources of software performance degradation.

To manage software aging in complex enterprise computing systems, a multivariate pattern-recognition technique may be applied to performance parameters collected from the enterprise computing systems to trigger software rejuvenation in the enterprise computing systems when software aging is detected. Such proactive prediction and management of software aging is described in U.S. Pat. No. 7,100,079 (issued 29 Aug. 2006), by inventors Kenny C. Gross and Kishore S. Trivedi, entitled "Method and Apparatus for Using Pattern Recognition to Trigger Software Rejuvenation." For example, the approach described in the above-referenced patent may be used to predict errors such as out-of-memory (OOM) events by using a nonparametric model to infer memory usage and generating alerts based on the values of residuals computed by the model.

SUMMARY

The disclosed embodiments provide a system that detects anomalous events in a virtual machine. During operation, the system obtains time-series garbage-collection (GC) data collected during execution of a virtual machine in a computer system. Next, the system generates one or more seasonal features from the time-series GC data. The system then uses a sequential-analysis technique to analyze the time-series GC data and the one or more seasonal features for an anomaly in the GC activity of the virtual machine. Finally, the system stores an indication of a potential out-of-memory (OOM) event for the virtual machine based at least in part on identifying the anomaly in the GC activity of the virtual machine.

In some embodiments, the system also divides the time-series GC data into a training set and a test set, and validates the training set and the test set prior to analyzing the time-series GC data for the anomaly.

In some embodiments, validating the training set and the test set includes using the training set to verify a minimum workload on the virtual machine, and using the test set to verify a minimum level of GC activity in the virtual machine.

In some embodiments, the training set includes a first subset of the time-series GC data that is collected prior to a second subset of the time-series GC data in the test set.

In some embodiments, the system also analyzes the time-series GC data for an upward trend in the memory usage of the virtual machine prior to storing the indication of the potential OOM event in the virtual machine.

In some embodiments, the system suppresses the indication of the potential OOM event in the virtual machine based at least in part on identifying an absence of the upward trend in the memory usage of the virtual machine.

In some embodiments, using the sequential-analysis technique to analyze the time-series GC data and the one or more seasonal features for the anomaly in the GC activity of the virtual machine includes using the one or more seasonal features to obtain a seasonal adjustment of the time-series GC data, and applying the sequential-analysis technique to the seasonal adjustment to test the time-series GC data for the anomaly.

In some embodiments, the time-series GC data includes a time spent on GC and a heap size after GC.

In some embodiments, the sequential-analysis technique includes a sequential probability ratio test (SPRT).

In some embodiments, the indication is an alert that is transmitted to a recipient that is registered to monitor alerts for the virtual machine.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
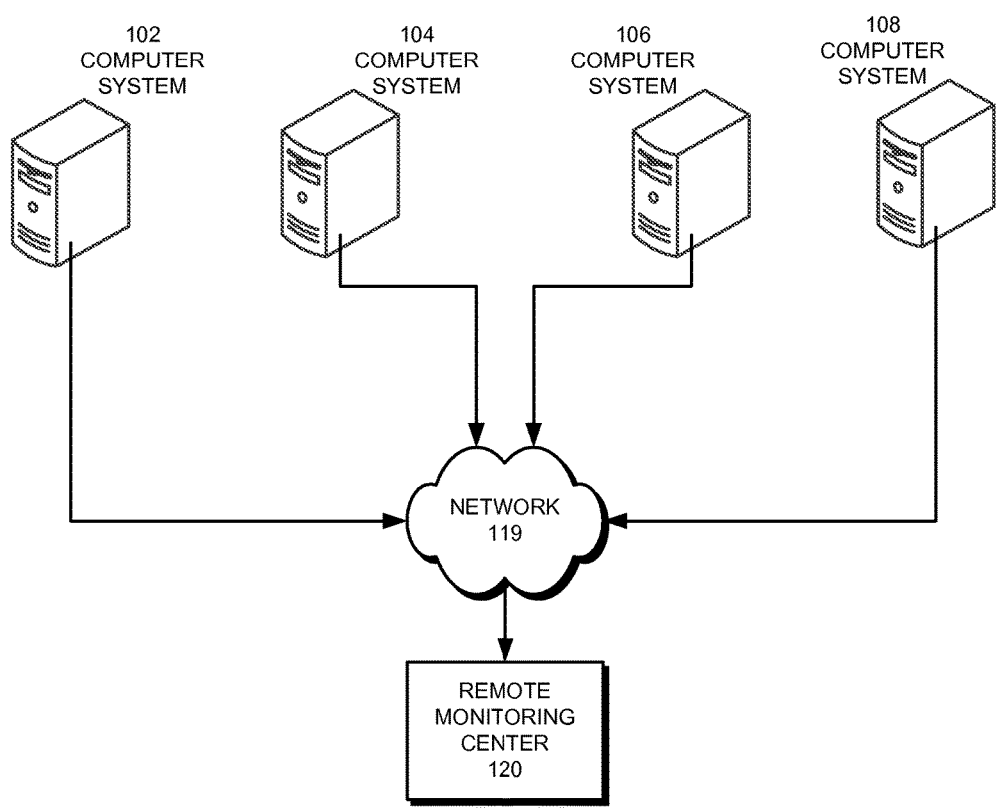
FIG. 1 shows a computer system that includes a service processor for processing time-series performance data in accordance with the disclosed embodiments.

The disclosed embodiments provide a method and system for analyzing time-series performance data from a computer system. The time-series performance data may be obtained from an operating system, a virtual machine, a process, and/or a software program in the computer system. As shown in FIG. 1, a number of computer systems 102-108 may be monitored by a remote monitoring center 120.

Computer systems 102-108 may include personal computers (PCs), laptop computers, tablet computers, mobile phones, portable media players, workstations, gaming consoles, and/or other network-enabled computing devices. Computer systems 102-108 may execute operating systems, virtual machines, middleware, databases, native applications, web applications, and/or other types of software programs.

Computer systems 102-108 may be associated with one or more service processors (not shown), which can be located within computer systems 102-108, or alternatively can be located in a standalone unit separate from computer systems 102-108. For example, the service processor(s) may be a server, cloud-computing system, personal computer, workstation, mobile phone, laptop computer, personal digital assistant (PDA), and/or portable media player. Similarly, the service processor(s) may reside in remote monitoring center 120 and/or another distributed mechanism for monitoring software activity on computer systems 102-108.

More specifically, each service processor may include a monitoring mechanism that performs a number of diagnostic functions for computer systems 102-108. One of these diagnostic functions involves recording performance parameters from virtual machines and/or other software programs executing on computer systems 102-108. In one or more embodiments, the performance parameters are recorded from telemetry signals generated from hardware sensors and/or software monitors within computer systems 102-108. For example, the service processor may interact with one or more client agents that execute on computer systems 102-108. The client agents may collect time-series performance parameters from one or more target software programs on computer systems 102-108 and transmit the performance parameters to the service processor for subsequent processing and storage.

The performance parameters can be transferred across network 119 to remote monitoring center 120 for diagnostic purposes. Network 119 can generally include any type of wired or wireless communication channel capable of coupling together computing nodes. This includes, but is not limited to, a local area network (LAN), a wide area network (WAN), a wireless network, a personal area networks (PAN), a virtual private network, an intranet, a cellular network, an Ethernet network, and/or a combination of networks. In one or more embodiments, network 119 includes the Internet. Upon receiving the performance parameters, remote monitoring center 120 may store the performance parameters in one or more logs and/or perform various diagnostic and/or remedial functions on computer systems 102-108, as described below with respect to FIG. 2.

Figure 2:
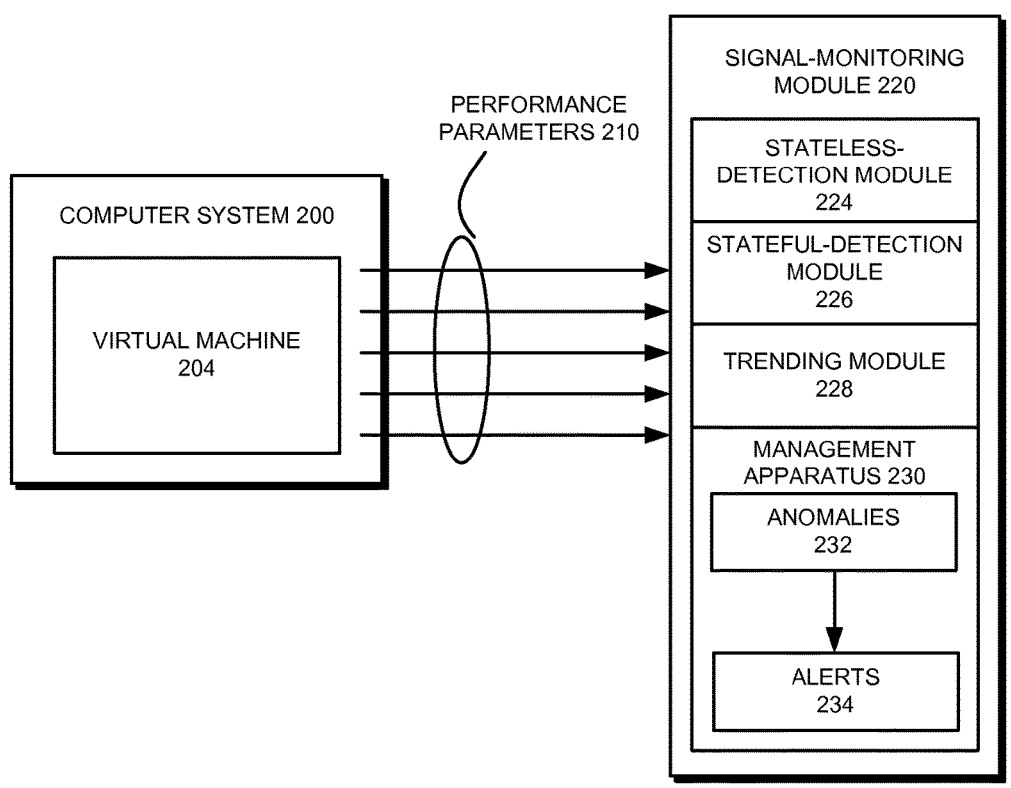
FIG. 2 shows an analysis system that examines both short-term real-time performance data and long-term historical performance data in accordance with the disclosed embodiments.

FIG. 2 shows an analysis system that examines both short-term real-time performance data and long-term historical performance data in accordance with the disclosed embodiments. In this example, a computer system 200 is monitored using a number of time-series performance parameters 210, which are transmitted to a signal-monitoring module 220. Signal-monitoring module 220 may assess the state of computer system 200 using performance parameters 210. For example, signal-monitoring module 220 may analyze performance parameters 210 to detect and manage faults in computer system 200 and/or issue alerts 234 when anomalies 232 or degradation risks are detected in computer system 200.

Signal-monitoring module 220 may be provided by and/or implemented using a processor associated with computer system 200. Alternatively, signal-monitoring module 220 may reside within a remote monitoring center (e.g., remote monitoring center 120 of FIG. 1) that obtains performance parameters 210 from computer system 200 over a network connection. Moreover, signal-monitoring module 220 may include functionality to analyze both real-time performance parameters 210 and long-term historical performance data. For example, signal-monitoring module 220 may be used to detect anomalies in performance parameters 210 received directly from the monitored computer system(s). Signal-monitoring module 220 may also be used in offline detection of anomalies from the monitored computer system(s) by processing archived and/or compressed telemetry data associated with the monitored computer system(s).

In one or more embodiments, signal-monitoring module 220 includes functionality to detect or predict software anomalies 232 such as out-of-memory (OOM) events in a virtual machine 204 and/or other software program running on computer system 200. For example, signal-monitoring module 220 may monitor the activity of a Java (Java™ is a registered trademark of Oracle America, Inc.) Virtual Machine (JVM) that executes one or more Java applications on a physical server. Such detection and/or prediction of software anomalies 232 may be performed by analyzing performance parameters 210 associated with garbage collection (GC), memory usage, computational workload, and/or other activity in virtual machine 204.

Those skilled in the art will appreciate that large-scale data center deployments may include tens of thousands of virtual machines (e.g., JVMs) and/or other software programs on hundreds of physical servers. An administrator of a data center may thus be responsible for managing and maintaining the execution of thousands of virtual machines on multiple physical machines. Moreover, alerts of anomalous events in the data center may be associated with a tradeoff between coverage and alert volume. For example, conventional techniques for detecting memory issues and/or other anomalous events in software programs may apply fixed thresholds to memory usage, amount of time spent in GC, and/or other performance parameters 210. When a parameter for a given software program crosses the corresponding threshold, an alert may be transmitted to a user (e.g., administrator). Lowering of the threshold may overwhelm the user with high volumes of alerts 234, including large numbers of false alarms, while increasing the threshold may cause the user to miss some anomalous events and increase the number of outages or other types of failure in the data center.

In one or more embodiments, signal-monitoring module 220 uses multiple techniques to perform detection or prediction of anomalies 232 in virtual machine 204. Such techniques may be coupled with alert-suppression mechanisms to increase the coverage of anomalous events without generating high volumes of false alarms. As shown in FIG. 2, signal-monitoring module 220 includes a stateless-detection module 224, a stateful-detection module 226, and a trending module 228. Stateless-detection module 224 may perform stateless detection of anomalous events in virtual machine 204, stateful-detection module 226 may perform stateful detection of anomalous events in virtual machine 204, and trending module 228 may use a trend-estimation technique to detect anomalous events in virtual machine 204.

All three modules may apply different statistical-analysis techniques to different subsets of performance parameters 210 to identify anomalies in the execution of virtual machine 204. Stateless-detection module 224 may apply a sequential-analysis technique to a seasonal adjustment of time-series GC data from performance parameters 210 to predict potential OOM events, as described in further detail below with respect to FIG. 3. Stateful-detection module 226 may use filtered time-series performance data from performance parameters 210 to build a statistical model of normal behavior in virtual machine 204 and use the statistical model to detect anomalous behavior in virtual machine 204, as described in further detail below with respect to FIG. 4. Trending module 228 may use the trend-estimation technique to analyze time-series GC data from performance parameters 210 within a calculated time window to identify OOM risks in virtual machine 204, as described in further detail below with respect to FIG. 5.

A management apparatus 230 in signal-monitoring module 220 may obtain analysis results from stateless-detection module 224, stateful-detection module 226, and trending module 228. For example, management apparatus 230 may collect indications of anomalies 232 from stateless-detection module 224, stateful-detection module 226, and trending module 228, along with supplementary metrics and/or time-series data used to generate the indications. Management apparatus 230 may use the supplementary metrics and/or data to validate the indications and/or perform root cause analysis of software performance issues in computer system 200.

After analysis results are obtained from stateless-detection module 224, stateful-detection module 226, and trending module 228, management apparatus 230 may combine the analysis results into a composite analytic for predicting anomalies 232 in virtual machine 204. For example, management apparatus 230 may use a logical disjunction to combine the analysis results into the composite analytic, such that an anomaly is detected if any of the analysis results identify the anomaly. Conversely, management apparatus 230 may use a logical conjunction, weighted combination, and/or other combination of the analysis results to determine a composite representation of an anomaly in virtual machine 204. Management apparatus 230 may additionally monitor the performance of stateless-detection module 224, stateful-detection module 226, and trending module 228 and adjust the weights and/or other criteria used to generate the composite analytic so that higher-performing techniques contribute more to the composite analytic than lower-performing techniques.

Management apparatus 230 may also use individual analysis results from stateless-detection module 224, stateful-detection module 226, and trending module 228 to detect anomalies 232 and generate alerts 234, in lieu of or in combination with the composite analytic. For example, management apparatus 230 may initially perform standalone anomaly detection using stateless-detection module 224 while the models and/or techniques used by stateful-detection module 226 and trending module 228 are being trained and/or initialized. After training or initialization is complete, management apparatus 230 may detect anomalies 232 using the combined techniques of stateless-detection module 224, stateful-detection module 226, and trending module 228. In other words, management apparatus 230 may transition among the detection techniques of stateless-detection module 224, stateful-detection module 226, and trending module 228 based on the availability of each module and/or the amount of data available for analysis by the module.

If an anomaly (e.g., anomalies 232) is identified, management apparatus 230 may generate an alert (e.g., alerts 234) of the anomaly. For example, management apparatus 230 may transmit a notification of a potential OOM event to a user such as an administrator of computer system 200. Management apparatus 230 may also perform one or more actions to remedy and/or avert a failure associated with the anomaly. For example, management apparatus 230 may mitigate an OOM risk by restarting virtual machine 204, allocating more memory (e.g., heap memory) to virtual machine 204, diverting memory to virtual machine 204 from other resources, and/or diverting workload from virtual machine 204 to other (e.g., new or unstressed) virtual machines.

To reduce the volume of overall and false alerts 234, management apparatus 230 and/or another component of signal-monitoring module 220 may suppress an alert based on further analysis of performance parameters 210 of virtual machine 204. As described in further detail below, an indication of an anomalous event may trigger the analysis of performance parameters 210 for an upward trend in the memory usage of virtual machine 204 and/or a decrease in the free memory of virtual machine 204 below a threshold. If the component detects the upward trend in memory usage and/or decrease in free memory below the threshold, the component may generate the alert. Conversely, if the memory usage is not trending upward and/or the amount of free memory is higher than the threshold, the component may suppress the alert.

Consequently, signal-monitoring module 220 may provide meaningful coverage of various types of anomalous events in virtual machine 204 without generating large volumes of alerts 234. In turn, alerts 234 generated by signal-monitoring module 220 may improve the management of anomalous events by an administrator of computer system 200 and/or another user over conventional threshold-based techniques that generate too many or too few alerts.

Figure 3:
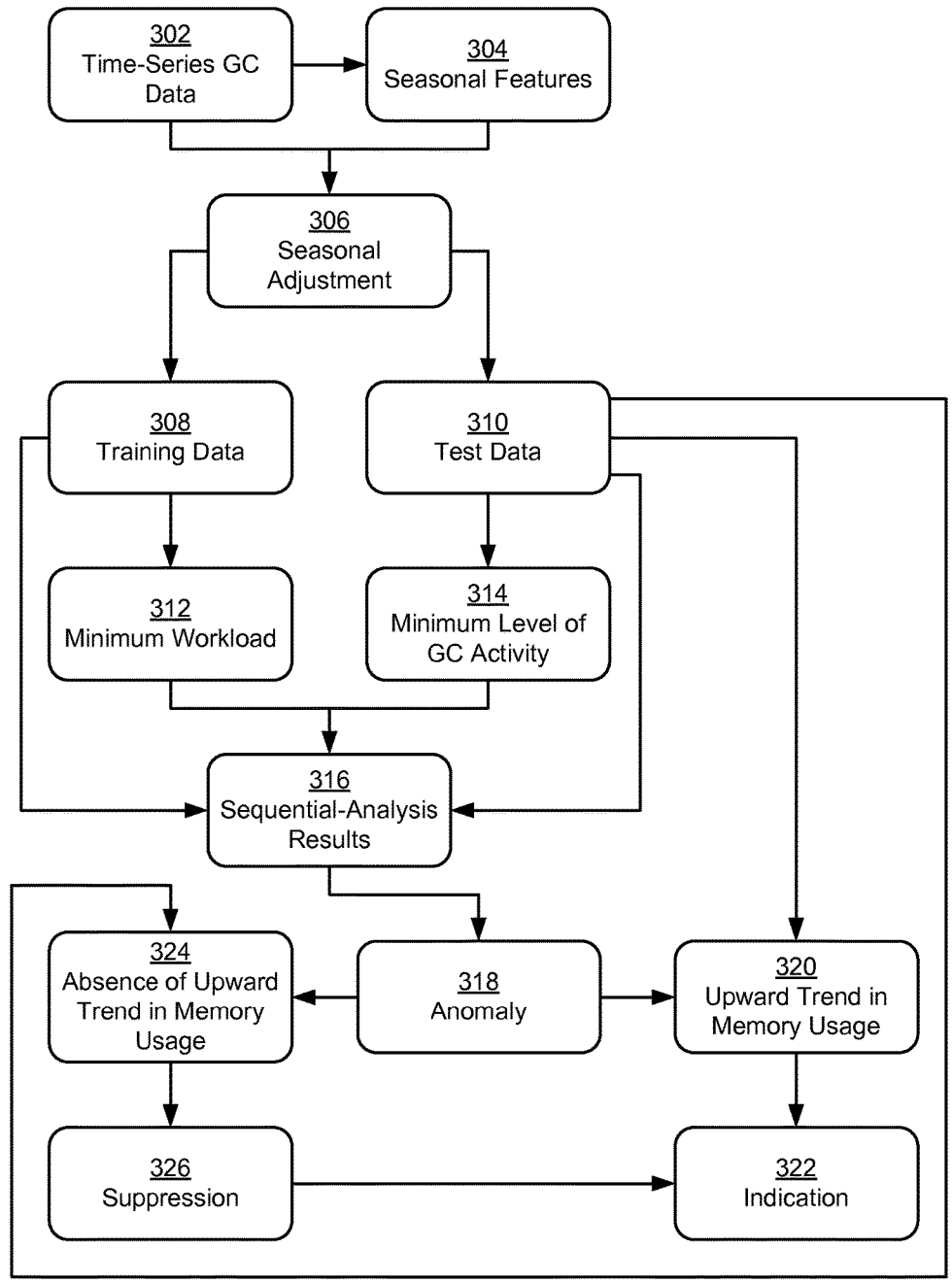
FIG. 3 shows the stateless detection of out-of-memory (OOM) events in a virtual machine in accordance with the disclosed embodiments.

FIG. 3 shows the stateless detection of OOM events in a virtual machine (e.g., virtual machine 204 of FIG. 2) in accordance with the disclosed embodiments. As mentioned above, stateless detection of OOM events in the virtual machine may be performed by stateless-detection module 224 of FIG. 2.

To detect OOM events, the stateless-detection technique may analyze time-series GC data 302 from the virtual machine. Time-series GC data 302 may be collected during execution of the virtual machine and provided to a service processor, such as service processor 118 of FIG. 1. For example, time-series GC data 302 may be obtained from a set of performance parameters for the virtual machine, such as performance parameters 210 of FIG. 1. Time-series GC data 302 may include metrics such as a time spent on GC and/or a heap (e.g., free memory) size after GC. Time-series GC data 302 may also track metrics for different types of garbage collection. For example, time-series GC data 302 may track the time spent in GC and number of GC invocations for major GC, minor GC, and/or concurrent GC in the virtual machine.

Time-series GC data 302 may be analyzed to generate one or more seasonal features 304 from time-series GC data 302. Seasonal features 304 may characterize the seasonality of time-series GC data 302. For example, seasonal features 304 may represent portions of time-series GC data 302 that are associated with periodic (e.g., daily, weekly, monthly, yearly, etc.) spikes in virtual machine activity, which can be caused by user demand for software running on the virtual machine and/or other factors related to periodic fluctuations in usage of the virtual machine. To describe the seasonality of time-series GC data 302, seasonal features 304 may include attributes such as amplitudes, directions, periods, frequencies, and/or phases associated with seasonal cycles in time-series GC data 302.

To generate seasonal features 304, a seasonal-decomposition technique such as seasonal trend decomposition using Loess (STL) may be used to decompose time-series GC data 302 into a trend component, a seasonal component containing seasonal features 304, and a remainder component. Seasonal features 304 may then be used to obtain a seasonal adjustment 306 of time-series GC data 302. Continuing with the above example, the seasonal-decomposition technique may be used to separate seasonal features 304 from other components of time-series GC data 302, thus producing seasonal adjustment 306 from the trend, remainder, and/or other non-seasonal components of the decomposition.

Smoothing, upsampling, weighting, scaling, and/or other adjustments of time-series GC data 302, seasonal features 304, and/or seasonal adjustment 306 may also be performed to facilitate subsequent analysis of time-series GC data 302 and/or seasonal adjustment 306. For example, seasonal adjustment 306 may be further processed to produce a uniform stationary time series that can be analyzed by a sequential-analysis technique for anomalous events. Seasonal decomposition and adjustments of time-series GC data is described in a U.S. Provisional Patent Application entitled "Seasonal Trending, Forecasting, Anomaly Detection, and Endpoint Prediction of Java Heap Usage," by inventors Eric S. Chan, Rafiul Ahad, Adel Ghoneimy and Adriano Santos, having Ser. No. 61/811,102 and filing date 11 Apr. 2013, which is incorporated herein by reference.

After such adjustments are made, seasonal adjustment 306 and/or time-series GC data 302 may be divided into a set of training data 308 and a set of test data 310. Training data 308 may include a first subset of seasonal adjustment 306 and/or time-series GC data 302 collected prior to a second subset of seasonal adjustment 306 and/or time-series GC data 302 in test data 310. For example, test data 310 may include the most recent hour of "current" time-series GC data 302, and training data 308 may include "historic" time-series GC data 302 that spans a pre-specified number of days (e.g., one week, two weeks, etc.) before the most recent hour of current data.

Those skilled in the art will appreciate that seasonal adjustment 306 and/or time-series GC data 302 may be divided into training data 308 and test data 310 in a number of ways. For example, the intervals spanned by training data 308 and test data 310 may be adjusted to improve the performance of stateless detection of anomalous events in the virtual machine. In another example, seasonal adjustment 306 and/or time-series GC data 302 may be divided into multiple sets of training data 308 and/or test data 310 of the same or different durations before training data 308 and/or test data 310 are used to perform stateless detection of anomalous events in the virtual machine. In a third example, other components of time-series GC data 302 may be included with seasonal adjustment 306 in training data 308 and test data 310 to facilitate additional analysis of the virtual machine's state and behavior.

Training data 308 and test data 310 may then be validated. As shown in FIG. 3, training data 308 may be validated to verify a minimum workload 312 on the virtual machine, and test data 310 may be validated to verify a minimum level of GC activity 314 in the virtual machine. If validation of either training data 308 or test data 310 fails, stateless detection of anomalies in the virtual machine may be discontinued, or settings used in subsequent analysis of time-series GC data 302 and/or seasonal adjustment 306 may be modified. For example, if training data 308 does not vary significantly due to light-load conditions, the evaluation interval for training data 308 may be adjusted, or subsequent stateless detection of anomalies in test data 310 may be performed using a "default" probability distribution instead of the probability distribution of training data 308.

After training data 308 and test data 310 are validated, a sequential-analysis technique may be applied to training data 308 and test data 310 to test time-series GC data 302 for an anomaly 318. The sequential-analysis technique may perform statistical analysis of training data 308 and/or test data 310 until a stopping condition is met. For example, the sequential-analysis technique may include a sequential probability ratio test (SPRT) that is applied to seasonal adjustment 306 to detect anomaly 318 in the time spent on GC for the virtual machine.

During SPRT, a distribution of times spent on GC from training data 308 may be used as a nominal distribution. Next, samples of times spent on GC from test data 310 may be analyzed to determine if the samples are more likely to be generated from the nominal distribution or an anomalous distribution with a mean that is offset from that of the nominal distribution by a configurable number of standard deviations in the positive direction. If sequential-analysis results 316 from SPRT indicate that the distribution of times spent on GC in test data 310 is more likely to be generated from the anomalous distribution, anomaly 318 may be identified in the GC activity of the virtual machine. If sequential-analysis results 316 indicate that the distribution of times spent on GC in test data 310 is more likely to be generated from the nominal distribution, anomaly 318 is not detected, and stateless detection of OOM events in the current set of test data 310 is completed.

Once anomaly 318 is detected, test data 310 may be further analyzed to detect an upward trend in memory usage 320 or an absence of an upward trend in memory usage 324. For example, linear regression and/or another slope-estimation technique may be used to identify the presence or absence of a gradual increase in the time spent in GC or heap size of the virtual machine in test data 310. If upward trend in memory usage 320 is found, an indication 322 of anomaly 318 is stored. For example, an alert of anomaly 318 may be transmitted to a recipient that is registered to monitor alerts for the virtual machine. Conversely, if absence of upward trend in memory usage 324 is found, a suppression 326 of indication 322 is made to reduce the volume of alerts related to OOM events, and in turn, the ability of the recipient to handle the alerts.

Figure 4:
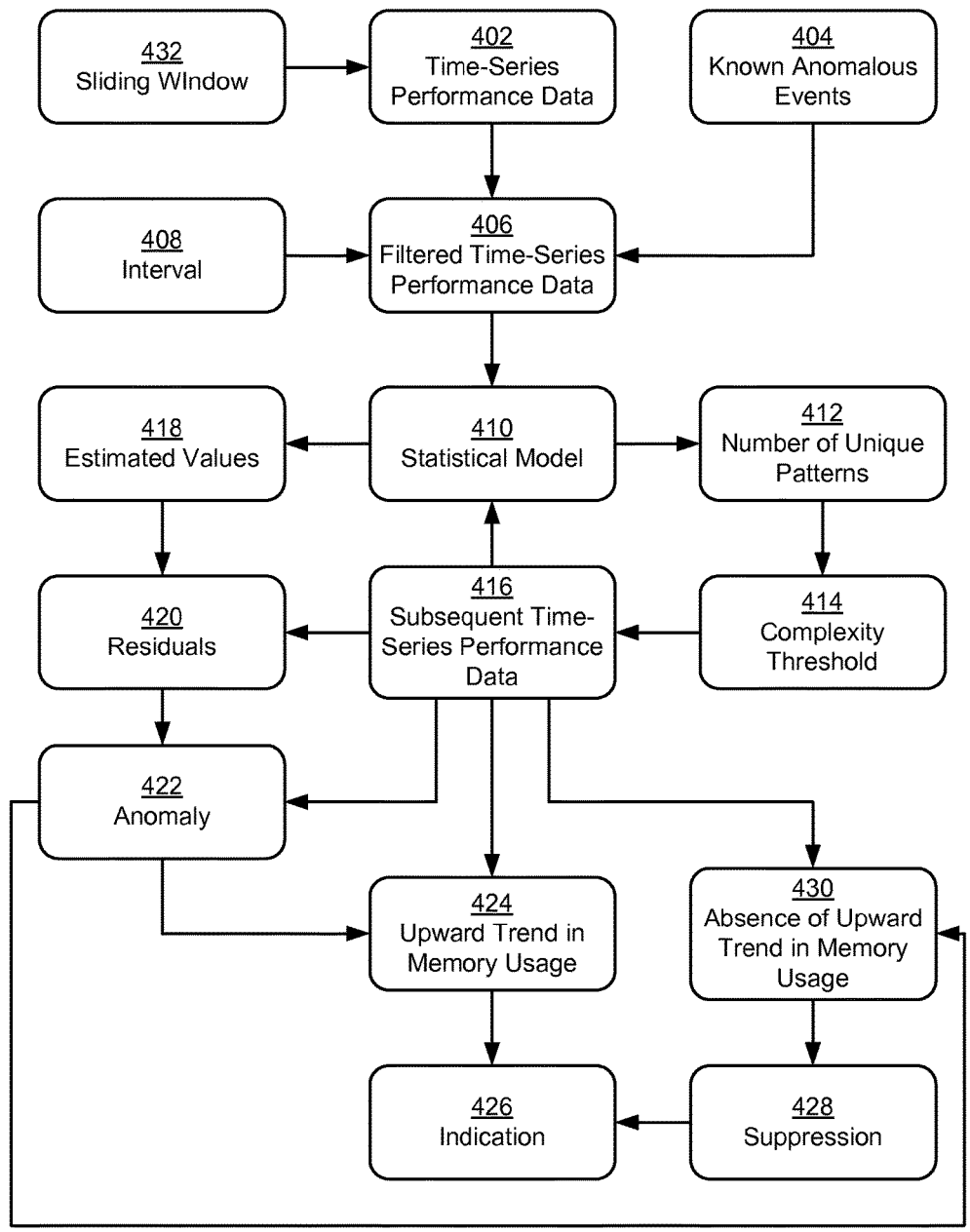
FIG. 4 shows the stateful detection of anomalous events in a virtual machine in accordance with the disclosed embodiments.

FIG. 4 shows the stateful detection of anomalous events in a virtual machine in accordance with the disclosed embodiments. Such stateful detection may be performed by stateful-detection module 226 of FIG. 2.

To perform stateful detection of anomalous events, time-series performance data 402 for a virtual machine (e.g., virtual machine 204 of FIG. 2) is obtained. For example, time-series performance data 402 may be collected from the virtual machine during execution of the virtual machine in a computer system, such as computer system 200 of FIG. 2. Time-series performance data 402 may include time-series GC data such as a time spent on GC, a number of GC invocations, and/or a heap size. Time-series performance data 402 may also include other metrics, such as data related to computational loads, latencies, threads, processes, power consumption, disk activity, and/or network activity.

As shown in FIG. 4, time-series performance data 402 may be obtained using a sliding window 432. For example, sliding window 432 may include the most recent 30 days of time-series performance data 420 and/or 30 days of time-series performance data 402 up to an hour before the current time.

Next, filtered time-series performance data 406 is generated from time-series performance data 402 by removing a subset of time-series performance data 402 around one or more known anomalous events 404 in the virtual machine. For example, one or more times of known anomalous events 404 such as OOM events and/or virtual machine restarts may be obtained from records of anomalous events 404 from the computer system, a service processor, and/or another monitoring mechanism. Subsets of time-series performance data 402 within an interval 408 (e.g., 24 hours) before and after known anomalous events 404 may then be removed from time-series performance data 402 to produce filtered time-series performance data 406.

Filtered time-series performance data 406 may be generated to exclude portions of time-series performance data 402 that are representative of anomalous events 404. For example, filtered time-series performance data 406 may exclude portions of time-series performance data 402 that lead to restarts in the virtual machine to prevent behavior associated with anomalous events from being learned. Filtered time-series performance data 406 may also exclude time-series performance data 402 immediately after the virtual machine restarts because such data may include high values for GC activity as the virtual machine ramps up. Moreover, interval 408 may be adjusted to balance the exclusion of patterns associated with known anomalous events 404 from filtered time-series performance data 406 with the retention of sufficient time-series performance data 402 from sliding window 432 to perform stateful detection of subsequent anomalous events in the virtual machine.

Next, filtered time-series performance data 406 is used to build a statistical model 410 of behavior in the virtual machine. As described above, filtered time-series performance data 406 may exclude behavior associated with known anomalous events 404 in the virtual machine. Consequently, statistical model 410 may learn only normal (e.g., non-anomalous) patterns of behavior from filtered time-series performance data 406.

In one or more embodiments, statistical model 410 is created using a nonlinear, nonparametric regression technique. For example, statistical model 410 may include an auto-associative kernel regression (AAKR) model; during training of the AAKR model, the number of exemplars and kernel bandwidth parameters may be optimized. Alternatively, statistical model 410 may use any number of nonlinear, nonparametric regression techniques. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington D.C., Nov. 13-17, 2000. This paper outlines several different pattern recognition approaches. Hence, the term "statistical model" as used in this specification can refer to (among other things) any 25 techniques outlined in [Gribok], including Ordinary Least Squares (OLS), Support Vector Machines (SVM), Artificial Neural Networks (ANNs), MSET, or Regularized MSET (RMSET).

After statistical model 410 is trained using filtered time-series performance data 406, a number of unique patterns 412 learned by statistical model 410 is obtained and compared to a complexity threshold 414. Complexity threshold 414 may represent the acquisition of a minimum complexity of behavior in the virtual machine by statistical model 410. As a result, complexity threshold 414 may specify a minimum number of unique patterns 412 (e.g., 15 unique patterns) to be learned by statistical model 410.

Complexity threshold 414 may be set to mitigate the generation of false alerts using statistical model 410. In particular, number of unique patterns 412 may be affected by variations in the time spent in GC (e.g., as a number of seconds per hour), number of GC invocations, and/or other metrics in filtered time-series performance data 406. An active virtual machine may have values for time spent in GC and number of GC invocations that vary according to fluctuations in the activity level of the virtual machine, while a virtual machine that experiences little to no activity may have many samples of zero values for the time spent in GC and number of GC invocations. A lack of activity in the virtual machine may cause statistical model 410 to learn a sparse pattern set from filtered time-series performance data 406, and any behavioral pattern that is outside the learned set may automatically be flagged as anomalous by statistical model 410. Thus, complexity threshold 414 may be set to a minimum number of unique patterns 412 learned by statistical model 410 to mitigate the subsequent generation of false positives by statistical model 410.

If number of unique patterns 412 does not meet complexity threshold 414, statistical model 410 is not used to identify anomalies in the behavior of the virtual machine. For example, statistical model 410 may be discarded, and other techniques (e.g., sequential analysis, trend estimation) may be used to detect OOM events and/or other anomalies in the virtual machine.

If number of unique patterns 412 satisfies complexity threshold 414, statistical model 410 is applied to subsequent time-series performance data 416 to identify an anomaly 422 in the activity of the virtual machine. For example, statistical model 410 may be applied to time-series performance data that was received after the creation of statistical model 410. During identification of anomaly 422, subsequent time-series performance data 416 may be provided to statistical model 410, and one or more estimated values 418 of subsequent time-series performance data 416 may be generated by statistical model 410. Statistical model 410 may calculate one or more residuals 420 by subtracting estimated values 418 from subsequent time-series performance data 416, and residuals 420 may be analyzed for a deviation representing anomaly 422.

In other words, residuals 420 may represent a deviation of the virtual machine from normal operating conditions. To detect anomaly 422, a sequential-analysis technique may be used to detect a statistical deviation in subsequent time-series performance data 416 from normal operating conditions. The sequential-analysis technique may continue to evaluate residuals 420 as residuals 420 are calculated by statistical model 410 until anomaly 422 is identified from residuals 420. For example, SPRT may use a cumulative sum of a log-likelihood ratio to identify whether subsequent time-series performance data 416 is more likely to come from a nominal distribution captured by statistical model 410 or an anomalous distribution that is offset from the nominal distribution by 10 standard deviations. If the SPRT determines that subsequent time-series performance data 416 is more likely to come from the anomalous distribution, anomaly 422 may be detected.

As with the stateless detection technique of FIG. 3, the stateful detection technique of FIG. 4 may reduce the false positive rate of statistical model 410 by outputting or suppressing an indication 426 of anomaly 422 based on additional analysis of subsequent time-series performance data 416. After anomaly 422 is detected, linear regression and/or another slope-estimation technique may be used identify the presence or absence of a gradual increase in the time spent in GC, heap size, and/or other representations of memory usage in the virtual machine. If an upward trend in memory usage 424 is found, an indication 426 of anomaly 422 is stored. For example, an alert of anomaly 422 may be transmitted to a recipient that is registered to monitor alerts for the virtual machine. Conversely, if an absence of upward trend in memory usage 430 is found, a suppression 428 of indication 426 is made to reduce the volume of alerts related to anomalous events, and in turn, the ability of the recipient to handle the alerts.

Because statistical model 410 is trained using time-series performance data 402 from the virtual machine, statistical model 410 may be customized to the behavior of the virtual machine. Moreover, the use of sliding window 432 and filtered time-series performance data 406 to build statistical model 410 may allow statistical model 410 to capture changes in the "normal" activity of the virtual machine without picking up anomalous behavior in the virtual machine. Finally, the creation of statistical model 410 from automatically "curated" training data (e.g., filtered time-series performance data 406) may allow the stateful detection technique to be scaled to large deployments of virtual machines (e.g., in data centers or cloud-computing systems) without requiring user input to train or otherwise configure statistical model 410 for each virtual machine.

Figure 5:
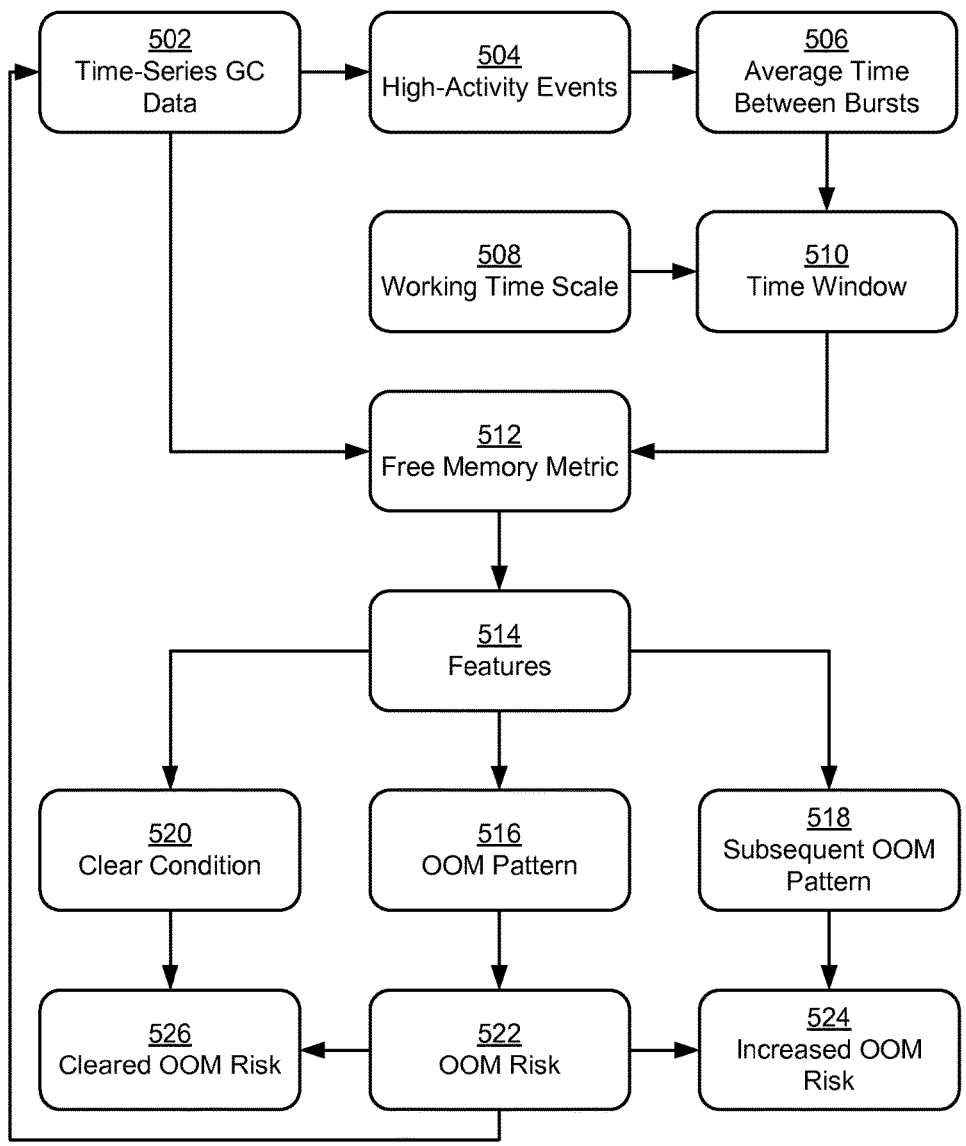
FIG. 5 shows the detection of OOM events in a virtual machine using free memory trending in accordance with the disclosed embodiments.

FIG. 5 shows the detection of OOM events in a virtual machine using free memory trending in accordance with the disclosed embodiments. For example, the free memory trending discussed below may be performed by trending module 228 of FIG. 2.

The trend-estimation technique of FIG. 5 may use time-series virtual machine (VM) data 502 that includes GC data such as an hourly time spent on GC, an hourly number of GC invocations, and/or a free memory metric (e.g., a heap size) to detect anomalies in the virtual machine. Time-series VM data 502 may also include other data related to the performance or execution of the virtual machine. For example, time-series VM data 502 may include a CPU consumption, average workload, number of threads, and/or other metrics associated with the virtual machine. After time-series VM data 502 is collected, a series of high-activity events 504 may be detected in time-series VM data 502. High-activity events 504 may represent repeated "bursts" of GC activity in the virtual machine (e.g., as the garbage collector reclaims memory). For example, a clustering-based burst-detection technique may be used to cluster values of a metric representing the per-minute number of GC invocations in the virtual machine, with the cluster containing the highest values used to identify high-activity events 504. Alternatively, other burst- or peak-detection techniques may be used to detect high-activity events 504 in time-series GC data 502.

Next, high-activity events 504 and a working time scale 508 may be used to compute a time window 510 for analyzing time-series GC data 502. Working time scale 508 may denote a period spanned by time-series GC data 502 that is represented by a number of high-activity events 504. For example, working time scale 508 may be set to span ten high-activity events 504 representing ten high-activity GC cycles in the virtual machine. To obtain time window 510 as a time interval, an average time between bursts 506 is calculated from high-activity events 504 and multiplied by working time scale 508. Continuing with the above example, a working time scale 508 of ten high-activity events 504 may be multiplied by a ten-minute average time between bursts 506 to obtain a 200-minute time window 510 for the virtual machine.

As a result, time window 510 may be adapted to the activity patterns of the virtual machine. Frequent bursts of activity in the virtual machine may result in a relatively short time window 510, while less frequent bursts of activity may extend time window 510. Moreover, if time-series VM data 502 shows a level of activity that is too low for detection of high-activity events 504, detection of anomalous events in the virtual machine using the trend-estimation technique may be delayed until discernible high-activity events 504 can be detected from time-series GC data 502.

After time window 510 is computed, a trend-estimation technique is used to analyze time-series VM data 502 within time window 510 to determine an OOM risk 522 in the virtual machine. More specifically, values of a free memory metric 512 (e.g., heap size) in time-series VM data 502 within time window 510 may be used to estimate a set of features 514, which are then matched to an OOM pattern 516 to detect OOM risk 522.

Features 514 may be automatically selected for comparison to OOM pattern 516 based on the relevance of each feature to OOM risk 522, as described in further detail below with respect to FIG. 10. One or more features 514 may also be selected by a user after analyzing time-series VM data 502 in time window 510, in lieu of or in addition to the automatically selected features 514.

OOM pattern 516 may be constructed as a set of rules to be applied to features 514. For example, OOM pattern 516 may include a series of rules related to the values of features 514, all of which must be satisfied for OOM pattern 516 to be detected in features 514. Alternatively, conformity of features 514 to OOM pattern 516 may be based on other criteria. For example, OOM pattern 516 may be detected when a score that is calculated from a weighted combination of features 514 and rules in OOM pattern 516 exceeds a threshold. In another example, only a subset of the rules must be met by features 514 for OOM pattern 516 to be found. Like features 514, rules in OOM pattern 516 may be generated based on automated analysis of time-series GC data 502 and/or user input.

Features 514 may include a set of numeric values, Boolean values, probabilities, and/or other representations of free memory metric 512 and/or other time-series GC data 502. For example, features 514 may include the following:
- a slope of free memory metric 512 within time window 510;
- a slope of free memory metric 512 in the left half of time window 510;
- a slope of free memory metric 512 in the right half of time window 510; and
- a probability of free memory metric 512 dropping below 50 MB.

In turn, OOM pattern 516 may include the following:
- a statistically significant negative slope of free memory metric 512;
- a magnitude of the statistically significant negative slope that is greater than 20% of the minimum value for free memory metric 512 in time window 510;
- a greater than 0.5% probability that free memory metric 512 drops below 50 MB; and
- a lack of step change in free memory metric 512.

For features 514 to conform to OOM pattern 516, all conditions in OOM pattern 516 must be met.

To match features 514 to OOM pattern 516 in the above example, a slope-estimation technique may be used to estimate the slope of free memory metric 512 across time window 510, in the left half of time window 510, and in the right half of time window. In the slope-estimation technique, a linear regression model with a constant is fit to free memory metric 512 in the left, right, and both halves of time window 510, and a confidence interval (e.g., 95%) of the slope is checked for inclusion of the zero value. If the confidence interval includes zero, a statistically significant negative slope of free memory metric 512 is not found. The slope is also ignored if the value of the slope is less than 20% of the minimum value in time window 510. If the confidence interval does not include zero, free memory metric 512 includes a statistically significant negative slope.

Similarly, a lack of step change in free memory metric 512 may be identified if free memory metric 512 in both halves of time window 510 has a statistically significant negative slope. Because each half of time window 510 contains fewer points than the entirety of time window 510, the confidence interval for determining a statistically significant negative slope for both halves of time window 510 may be wider than the confidence interval for all of time window 510. As a result, the confidence interval for both halves may be recalculated to include both slopes using the following formula:

$$\text{confidence(left AND right)} = \text{confidence(left)} + \text{confidence(right)} - \text{confidence(right)} * \text{confidence(right)}$$

Finally, the probability of free memory metric 512 dropping below 50 MB may be calculated by counting the number of values of free memory metric 512 in time window 510 that fall below 50 MB and dividing by the total number of samples in time window 510. If the resulting value is greater than 0.005, a greater than 0.5% probability that free memory metric 512 drops below 50 MB may be found.

Those skilled in the art will appreciate that other features 514, rules, and/or techniques may be used to detect OOM pattern 516 in time-series GC data 502. As discussed above, features 514 and OOM pattern 516 may relate to a variety of values, statistics, and/or other representations of free memory metric 512 and/or time-series GC data 502. Similarly, multiple types of statistical and/or numerical analysis techniques may be used to generate features 514 and/or match features 514 to OOM pattern 516.

If OOM risk 522 is identified, an indication of OOM risk 522 may be generated and/or stored. For example, the status of the virtual machine may be updated with the indication, and an alert of OOM risk 522 may be transmitted to a recipient that is registered to monitor alerts for the virtual machine.

In addition, OOM risk 522 may be adjusted based on analysis of time-series GC data 502 in subsequent time windows. If features 514 in a subsequent (e.g., consecutive) time window 510 also match OOM pattern 518, an additional indication of an increased OOM risk 524 may be generated and/or stored. OOM risk 522 may continue to be increased as long as OOM pattern 516 continues to be found in subsequent time windows. Once OOM risk 522 reaches a pre-specified level, OOM risk 522 may be mitigated through heap resizing, load rebalancing, restarting of the virtual machine, and/or another remedial action.

If OOM pattern 516 is not detected in a subsequent time window, the current level of OOM risk 522 may be maintained for a pre-specified period. For example, a "flattened" OOM risk 522 may remain associated with the status of the virtual machine until OOM pattern 516 is not detected for a certain number of consecutive time windows. If features 514 in a subsequent time window 510 match a clear condition 520, OOM risk 522 may also be removed, and the status of the virtual machine may be updated with a cleared OOM risk 526. For example, the status of the virtual machine may be changed from OOM risk 522 to cleared OOM risk 526 after a statistically significant positive slope is found in free memory metric 512 for a certain number of consecutive time windows and/or the probability that free memory metric 512 drops below 50 MB is lower than 0.05%.

By performing free memory trending on time-series GC data 502 based on a custom time window 510 that encompasses multiple cycles of short-term activity of the virtual machine, the trend-estimation technique of FIG. 5 may avoid the detection of short-term trends in free memory metric 512 while allowing for detection of slow-developing OOM risks. Conversely, a conventional trend-estimation technique with a fixed time window may either produce a large number of false alarms or miss a significant number of real OOM events in the virtual machine.

Figure 6:
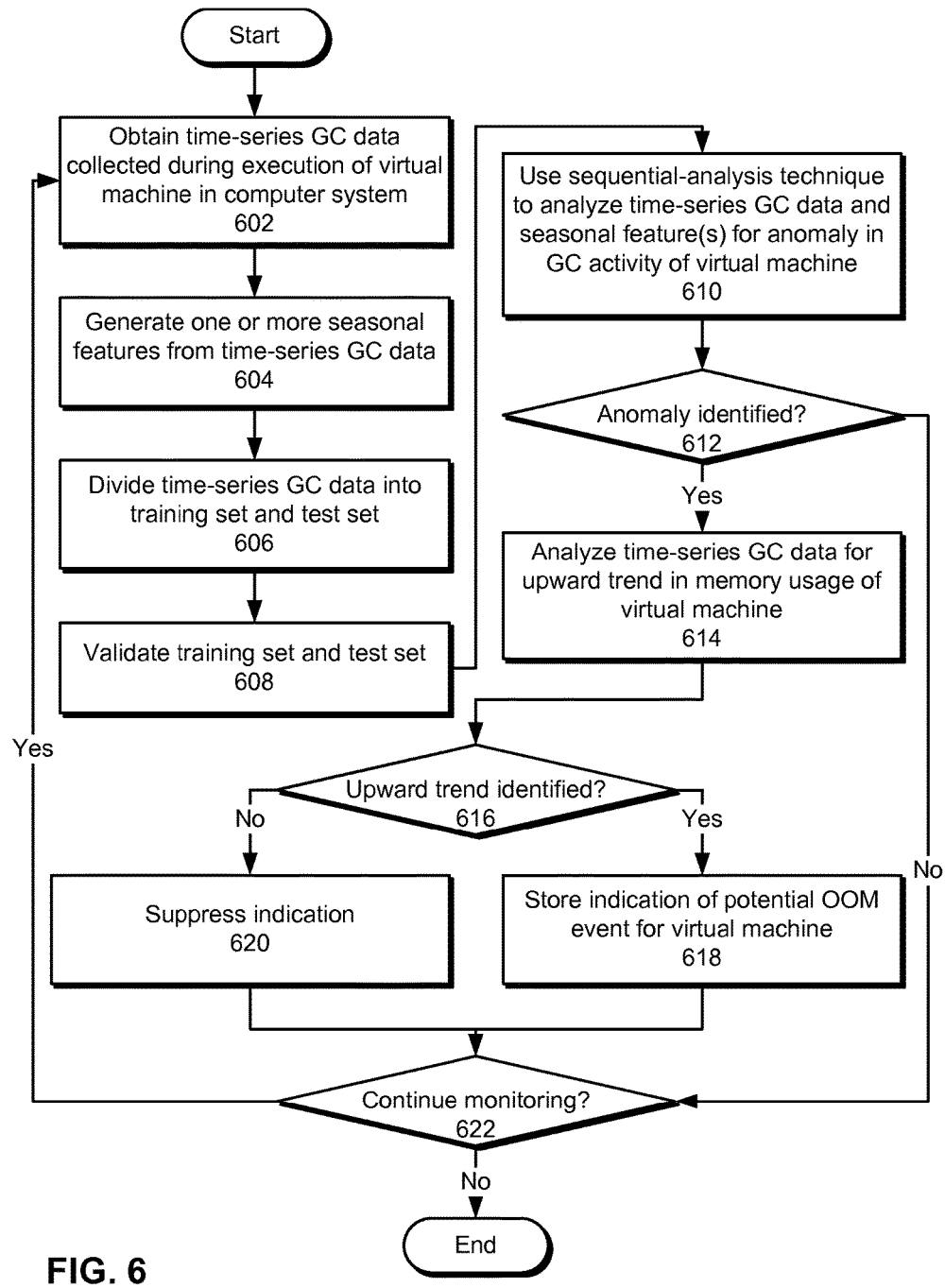
FIG. 6 shows a flowchart illustrating the process of detecting anomalous events in a virtual machine in accordance with the disclosed embodiments.

FIG. 6 shows a flowchart illustrating the process of detecting anomalous events in a virtual machine in accordance with the disclosed embodiments. More specifically, FIG. 6 shows a flowchart of stateless detection of OOM events in the virtual machine. In one or more embodiments, one or more of the steps may be omitted, repeated, and/or performed in a different order. Accordingly, the specific arrangement of steps shown in FIG. 6 should not be construed as limiting the scope of the embodiments.

Initially, time-series GC data collected during execution of the virtual machine in a computer system is obtained (operation 602). The time-series GC data may include metrics such as a time spent on GC per hour and/or a heap size after GC. Next, one or more seasonal features are generated from the time-series GC data (operation 604). For example, a seasonal-decomposition technique may be used to decompose the time-series GC data into a trend component, a seasonal component containing the seasonal features, and a remainder component.

The time-series GC data is divided into a training set and a test set (operation 606), and the training and test sets are validated (operation 608). For example, the training set may include a first subset of the time-series GC data that is collected prior to a second subset of the time-series GC data in the test sets. During validation of the training and test sets, the training set may be used to verify a minimum workload on the virtual machine, and the test set may be used to verify a minimum level of GC activity in the virtual machine.

A sequential-analysis technique is also used to analyze the time-series GC data and seasonal feature(s) for an anomaly in the GC activity of the virtual machine (operation 610). For example, the seasonal feature(s) may be used to obtain a seasonal adjustment of the time-series GC data, and SPRT may be applied to the seasonal adjustment to test the non-seasonal components of time-series GC data for the anomaly.

The anomaly may be identified (operation 612) by the sequential-analysis technique. If no anomaly is found in the time-series GC data, the virtual machine may continue to be monitored (operation 622). If an anomaly is found in the time-series GC data, the time-series GC data is analyzed for an upward trend in the memory usage of the virtual machine (operation 614). For example, a slope-estimation technique may be used to identify the presence or absence of a gradual increase in the time spent in GC and/or heap size metrics.

The anomaly may then be processed based on the identification of the upward trend (operation 616) in the memory usage of the virtual machine. If the upward trend is found, an indication of a potential OOM event for the virtual machine is stored (operation 618). For example, an alert of the potential OOM event may be transmitted to a recipient that is registered to monitor alerts for the virtual machine. Conversely, if the upward trend is not found, the indication is suppressed (operation 620). Continuing with the above example, an alert associated with the anomaly may be suppressed to reduce the volume of alerts received by the recipient.

Monitoring of the virtual machine may continue (operation 622) during execution of the virtual machine. If monitoring of the virtual machine is to continue, time-series GC data is collected from the virtual machine (operation 602), and one or more seasonal features are generated from the time-series GC data (operation 604). The time-series GC data is divided into a training set and a test set (operation 606), and both sets of data are validated (operation 608). A sequential-analysis technique is then used to analyze the time-series GC data and seasonal feature(s) for an anomaly in the GC activity of the virtual machine (operations 610-612). If the anomaly is found, an indication of the anomaly is generated based on the presence or absence of an upward trend in the memory usage of the virtual machine (operations 614-620). Monitoring of the virtual machine may thus continue until execution of the virtual machine is discontinued.

Figure 7:
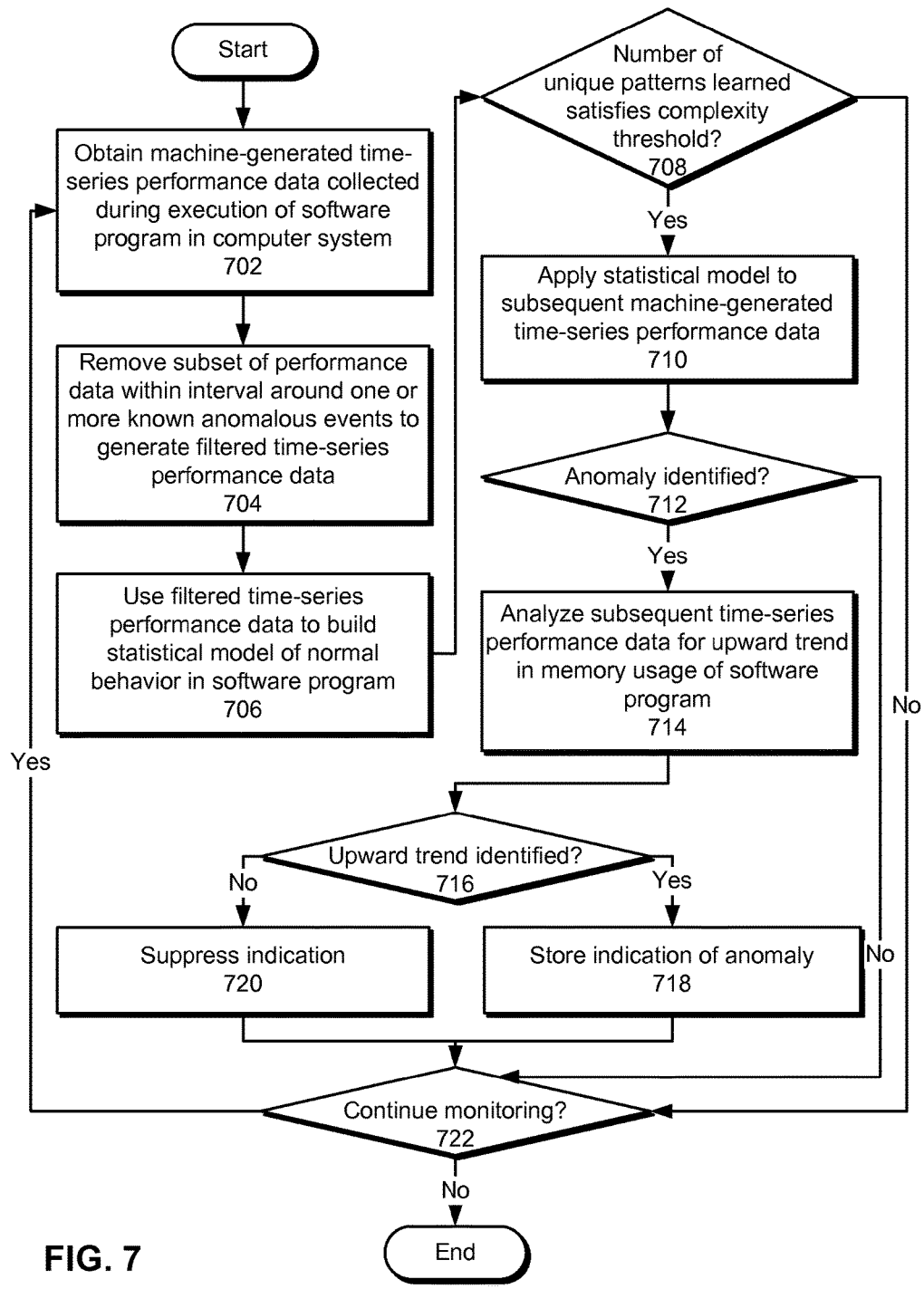
FIG. 7 shows a flowchart illustrating the process of detecting anomalous events in a software program in accordance with the disclosed embodiments.

FIG. 7 shows a flowchart illustrating the process of detecting anomalous events in a software program in accordance with the disclosed embodiments. More specifically, FIG. 7 shows a flowchart of stateful detection of OOM events in a software program such as a virtual machine. In one or more embodiments, one or more of the steps may be omitted, repeated, and/or performed in a different order. Accordingly, the specific arrangement of steps shown in FIG. 7 should not be construed as limiting the scope of the embodiments.

Initially, machine-generated time-series performance data collected during execution of the software program in a computer system is obtained (operation 702). The machine-generated time-series performance data may include time-series GC data and/or other performance metrics for the software program. For example, the machine-generated time-series performance data may include a time spent in GC, a number of GC invocations, and/or a heap size for a virtual machine.

Next, a subset of the performance data is removed within an interval around one or more known anomalous events to generate filtered time-series performance data (operation 704). To generate the filtered time-series performance data, one or more times of the known anomalous event(s) are obtained (e.g., from records of the known anomalous events), and portions of the machine-generated time-series performance data are removed within the interval (e.g., 24 hours) before and after the time(s).

The filtered time-series performance data is then used to build a statistical model of normal behavior in the software program (operation 706). For example, the filtered time-series performance data may be used to train an AAKR model and/or other statistical model that is created using a nonlinear, nonparametric regression technique. After the statistical model is built, a number of unique patterns learned by the statistical model is obtained and compared to a complexity threshold (operation 708). If the number of unique patterns does not satisfy the complexity threshold, the statistical model is omitted from current use in identifying anomalies in the activity of the software program.

If the number of unique patterns satisfies the complexity threshold, the statistical model is applied to subsequent machine-generated time-series performance data (operation 710) from the software program to identify an anomaly (operation 712) in the activity of the software program. If no anomaly is identified, monitoring of the software program may continue (operation 722). If the anomaly is identified, the subsequent time-series performance data is analyzed for an upward trend in the memory usage of the software program (operation 714).

The anomaly may then be processed based on the identification of the upward trend (operation 716) in the memory usage of the software program. If the upward trend is found, an indication of a potential OOM event for the software program is stored (operation 718). For example, an alert of the potential OOM event may be transmitted to a recipient that is registered to monitor alerts for the software program. Conversely, if the upward trend is not found, the indication is suppressed (operation 720). Continuing with the above example, an alert associated with the anomaly may be suppressed to reduce the volume of alerts to the recipient.

Monitoring of the software program may continue (operation 722) during execution of the software program. If monitoring of the software program is to continue, machine-generated time-series performance data is obtained from the software program (operation 702), and filtered time-series performance data is generated from the machine-generated time-series performance data (operation 704). The filtered time-series performance data is used to build a statistical model (operation 706), and the statistical model is applied to subsequent machine-generated time-series performance data to identify an anomaly if the number of unique patterns learned by the statistical model satisfies the complexity threshold (operations 708-710). If an anomaly is found, an indication of the anomaly is generated based on the presence or absence of an upward trend in the memory usage of the software program (operations 712-720). Monitoring of the software program may thus continue until execution of the software program is discontinued.

Figure 8:
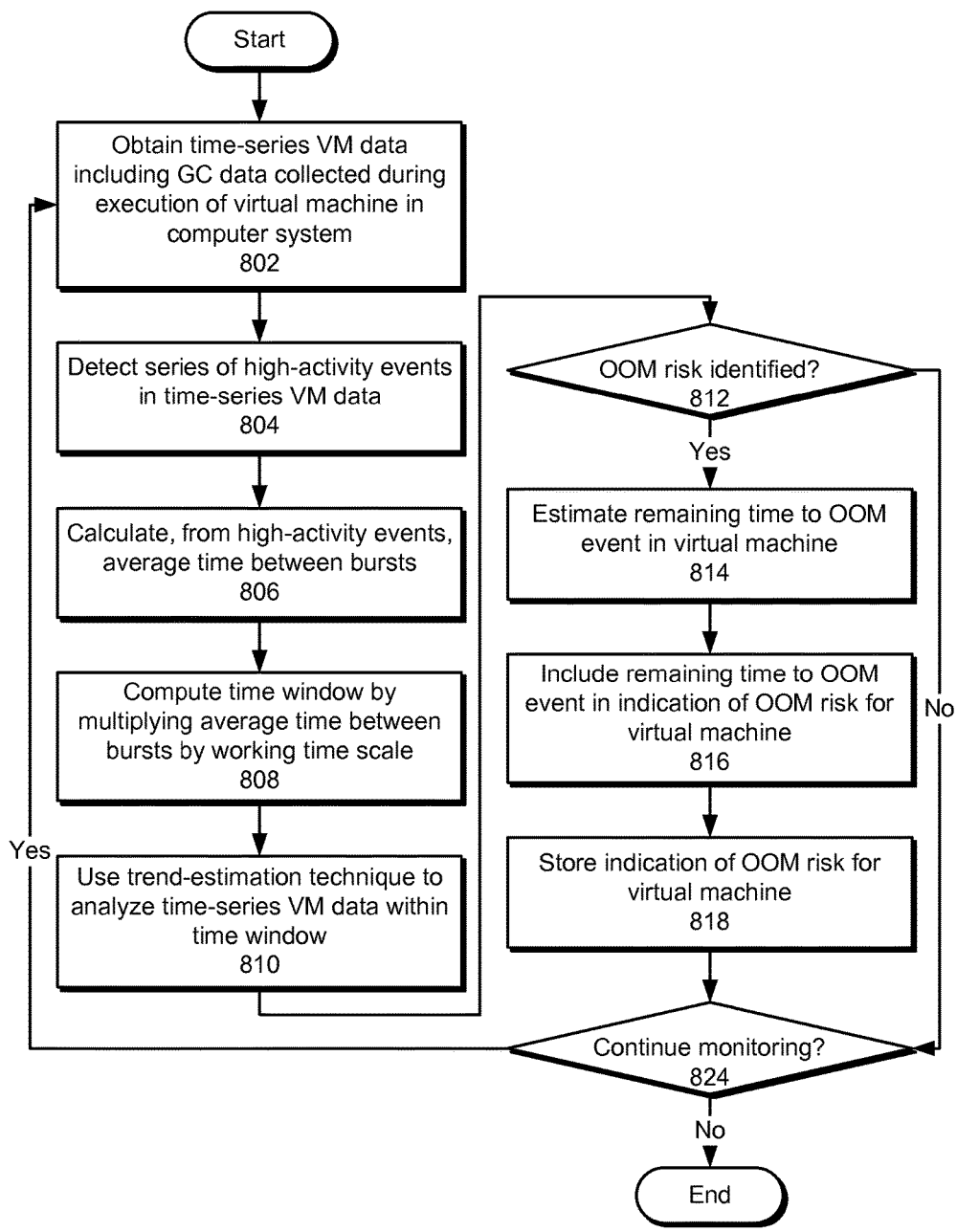
FIG. 8 shows a flowchart illustrating the process of detecting anomalous events in a virtual machine in accordance with the disclosed embodiments.

FIG. 8 shows a flowchart illustrating the process of detecting anomalous events in a virtual machine in accordance with the disclosed embodiments. More specifically, FIG. 8 shows a flowchart of detecting OOM events in a virtual machine using free memory trending. In one or more embodiments, one or more of the steps may be omitted, repeated, and/or performed in a different order. Accordingly, the specific arrangement of steps shown in FIG. 8 should not be construed as limiting the scope of the embodiments.

Initially, time-series VM data including GC data collected during execution of the virtual machine in a computer system is obtained (operation 802). The time-series VM data may include a time spent on GC, a number of GC invocations, and/or a free memory metric. Next, a time window for analyzing the time-series VM data is computed based on a working time scale of high-activity patterns in the time-series GC data.

To compute the time window, a series of high-activity events is detected in the time-series VM data (operation 804). For example, a burst- or peak-detection technique may be used to detect the high-activity events. Next, an average time between bursts is calculated from the high-activity events (operation 806), and the time window is computed by multiplying the average time between bursts by the working time scale (operation 808). Because the time window represents a time interval that spans a certain number of high-activity events in the virtual machine, the time window may be better suited for long-term trending of the time-series VM data than a fixed time interval that is applied to all virtual machines.

During long-term trending of the time-series VM data, a trend-estimation technique is used to analyze the time-series VM data within the time window (operation 810) to identify an OOM risk (operation 812) in the virtual machine, as described in further detail below with respect to FIG. 9. If the OOM risk is not identified, monitoring of the virtual machine may continue (operation 824). If the OOM risk is identified, the remaining time to an OOM event in the virtual machine is estimated (operation 814), and the remaining time is included in an indication of the OOM risk for the virtual machine (operation 816). For example, the remaining time to the OOM event is estimated by using the slope of the free memory metric, as estimated by the trend-estimation technique, to predict the time at which the free memory metric will reach zero. The indication of the OOM risk for the virtual machine is then stored (operation 818) and/or generated. For example, an alert of the OOM risk may be transmitted to an administrator of the virtual machine and/or computer system, and the administrator may use the estimated remaining time to the OOM event in the alert to determine the relative priority of the alert.

Monitoring of the virtual machine may continue (operation 824). If the virtual machine is to be monitored, time-series VM data is obtained from the virtual machine (operation 802), and a time window is computed for the virtual machine from high-activity events in the time-series VM data and the working time scale (operations 804-808). A trend-estimation technique is then used to analyze the time-series VM data for an OOM risk (operations 810-812). If the OOM risk is identified, the remaining time to an OOM event in the virtual machine is estimated (operation 814), and an indication of the OOM risk that includes the remaining time is generated and/or stored (operations 816-818). Monitoring of the virtual machine may thus continue until execution of the virtual machine is discontinued.

Figure 9:
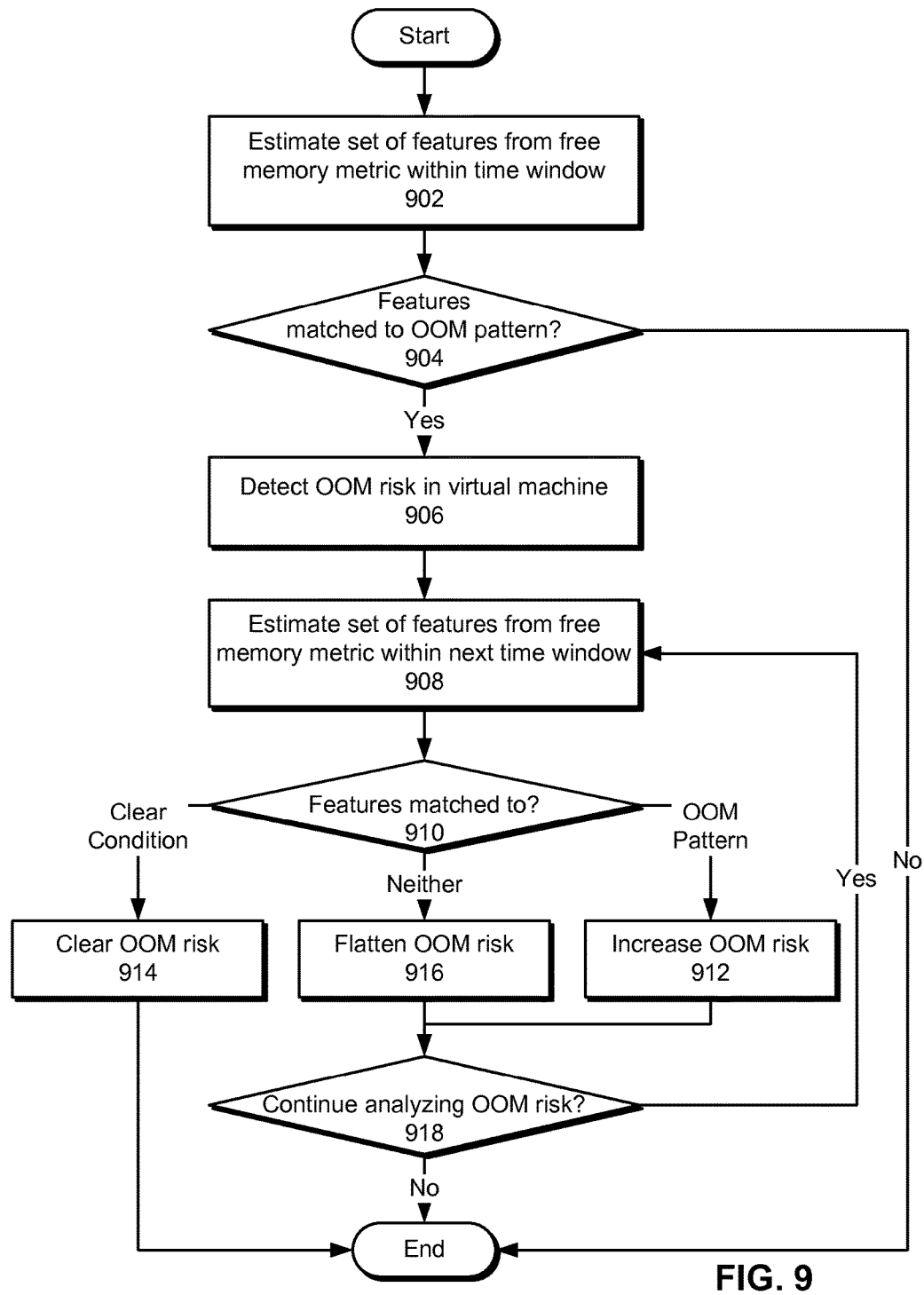
FIG. 9 shows a flowchart illustrating the process of determining an OOM risk for a virtual machine in accordance with the disclosed embodiments.

FIG. 9 shows a flowchart illustrating the process of determining an OOM risk for a virtual machine in accordance with the disclosed embodiments. In one or more embodiments, one or more of the steps may be omitted, repeated, and/or performed in a different order. Accordingly, the specific arrangement of steps shown in FIG. 9 should not be construed as limiting the scope of the embodiments.

First, a set of features is estimated from a free memory metric within a time window (operation 902). The free memory metric may be obtained from time-series VM data, as described above. The features may include values such as a slope of the free memory metric, a slope of the free memory metric in a left half of a time window, a slope of the free memory metric in a right half of the time window, and/or a probability of the free memory metric reaching a low level.

The features may be matched to an OOM pattern (operation 904). For example, the OOM pattern may include a number of rules that must be satisfied by all relevant features, such as a statistically significant negative slope of the free memory metric, a minimum magnitude of the statistically significant negative slope, a minimum threshold for the probability of the free memory metric reaching the low level, and/or a lack of step change in the free memory metric. The features may match the OOM pattern if a requisite number of the rules are satisfied. If the features do not match the OOM pattern, no OOM risk is identified in the current time window of time-series GC data, and the status of the virtual machine is unchanged.

If the features match the OOM pattern, the OOM risk is detected in the virtual machine (operation 906), and an indication of the OOM risk may be stored and/or generated, as described above. The features may then be estimated from the free memory metric within the next time window (operation 908), and the OOM risk may be assessed and/or adjusted based on the matching of the features to the OOM pattern or a clear condition (operation 910).

If the features from the next time window match the OOM pattern, the OOM risk is increased (operation 912). For example, the "level" of the OOM risk may be incremented each time the features from a subsequent time window match the OOM pattern. If the features match the clear condition, the OOM risk is cleared (operation 914), and monitoring of OOM risks in the virtual machine is reset. For example, the OOM risk may be cleared if the features no longer match the OOM pattern and the amount of free memory in the virtual machine is trending upward. If the features match neither the OOM pattern nor the clear condition, the OOM risk is flattened (operation 916). For example, the "flattened" OOM risk may represent an unchanged level of OOM risk in the virtual machine. Each update to the OOM risk in operations 912-916 may be used to update the indication of the OOM risk for the virtual machine. For example, each change in the level of OOM risk for the virtual machine may result in the generation of a corresponding alert, while alerting of the flattened OOM risk may optionally be omitted.

The OOM risk may continue to be analyzed (operation 918) while the OOM risk is present. If the OOM risk is to be analyzed, the set of features is estimated within subsequent time windows (operation 908), and the OOM risk is updated accordingly (operations 910-914) until the OOM risk is cleared.

Figure 10:
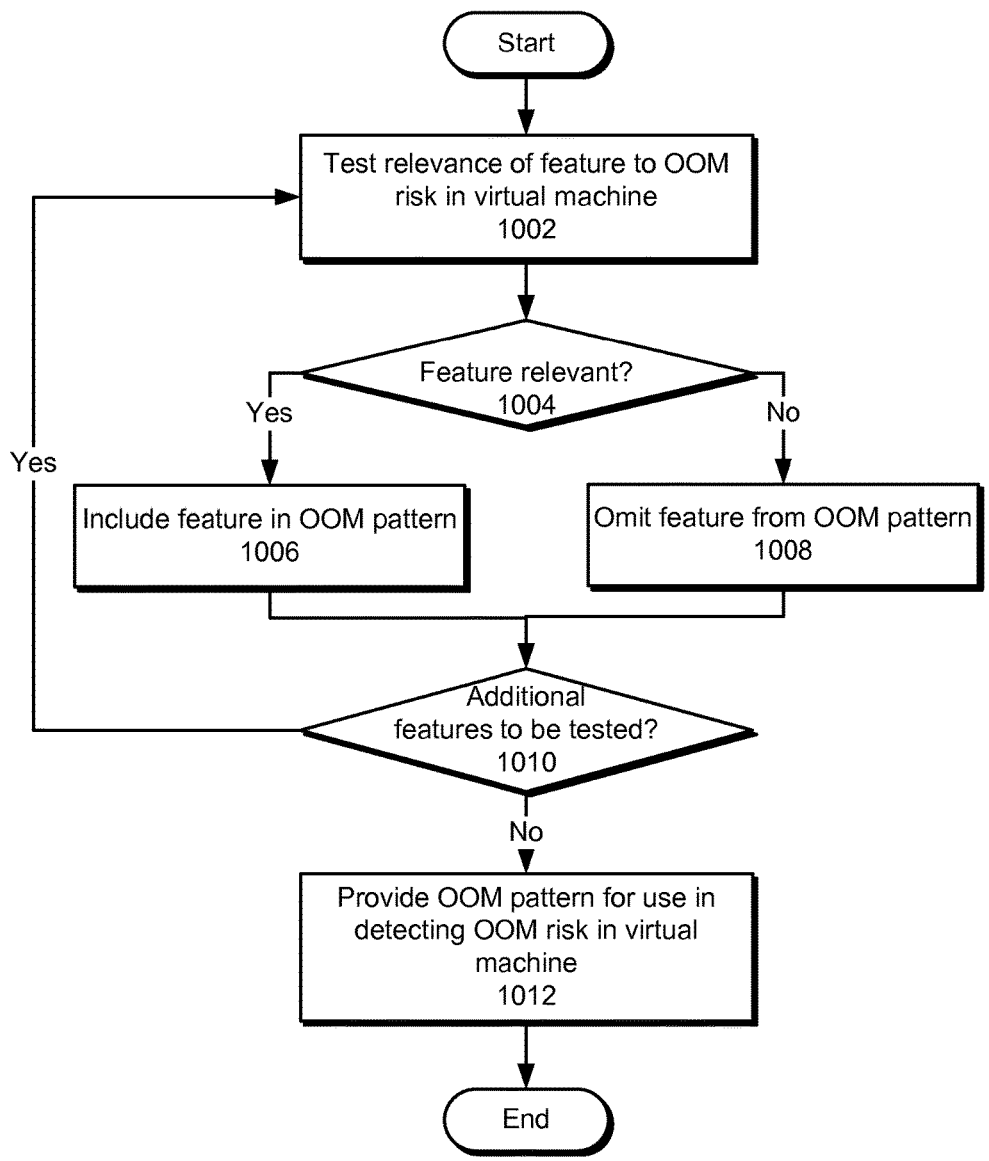
FIG. 10 shows a flowchart illustrating the process of selecting a set of features in an OOM pattern for detecting an OOM risk in a virtual machine in accordance with the disclosed embodiments.

FIG. 10 shows a flowchart illustrating the process of selecting a set of features in an OOM pattern for detecting an OOM risk in a virtual machine in accordance with the disclosed embodiments. In one or more embodiments, one or more of the steps may be omitted, repeated, and/or performed in a different order. Accordingly, the specific arrangement of steps shown in FIG. 10 should not be construed as limiting the scope of the embodiments.

First, the relevance of a feature to an OOM risk in a virtual machine is tested (operation 1002). The relevance may be tested by examining the features for a correlation, trend, indication, step change, and/or other factor related to the OOM risk. For example, the feature may be relevant to the OOM risk if a change in a value of the feature is correlated with a change in the OOM risk.

The feature may be managed based on the relevance of the feature (operation 1004). If the feature is relevant to the OOM risk, the feature is included in an OOM pattern (operation 1006) that is used to detect the OOM risk. If the feature is not relevant, the feature is omitted from the OOM pattern (operation 1008).

Additional features may be tested (operation 1010) for relevance to the OOM risk. If additional features are to be tested, the relevance of each feature to the OOM risk is tested (operations 1002-1004), and the feature is included in the OOM pattern or omitted from the OOM pattern based on the relevance (operations 1006-1008). After all features have been tested for relevance, the OOM pattern is provided for use in detecting the OOM risk in the virtual machine (operation 1012), as described above.

Figure 11:
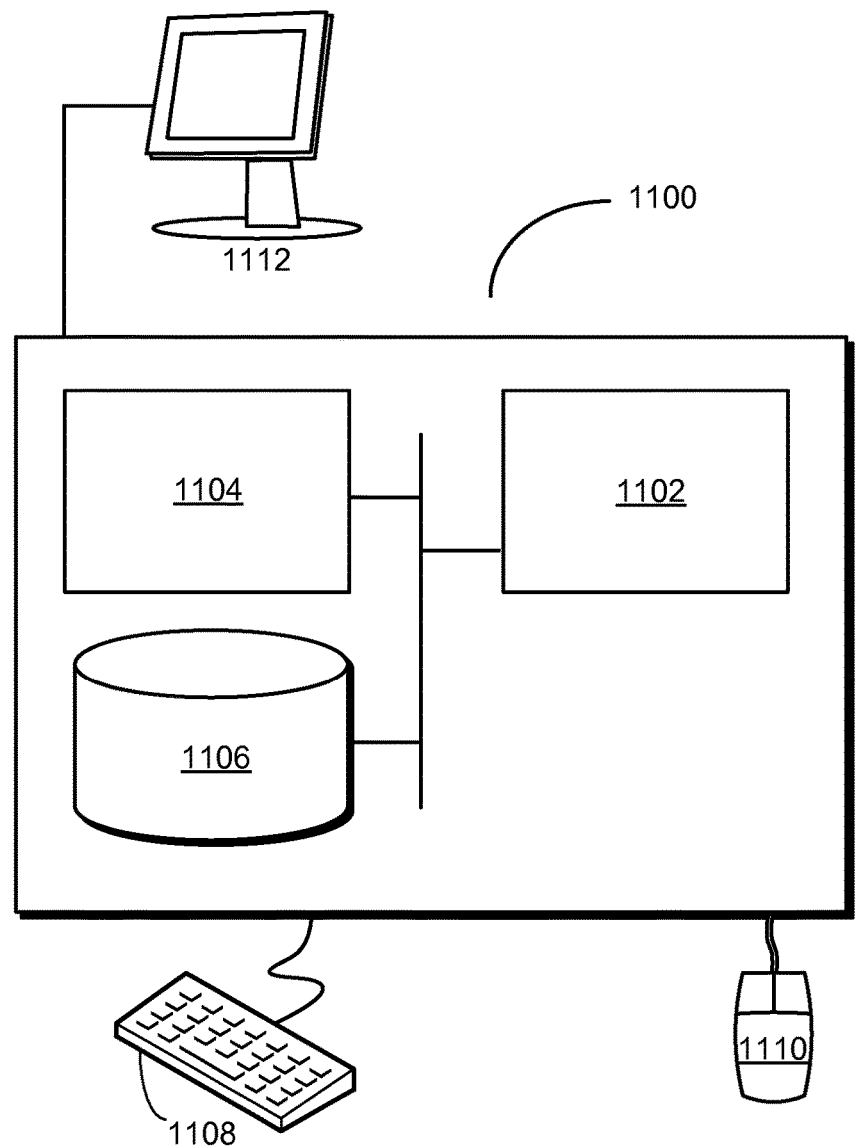
FIG. 11 shows a computer system in accordance with the disclosed embodiments.

FIG. 11 shows a computer system 1100. Computer system 1100 includes a processor 1102, memory 1104, storage 1106, and/or other components found in electronic computing devices. Processor 1102 may support parallel processing and/or multi-threaded operation with other processors in computer system 1100. Computer system 1100 may also include input/output (I/O) devices such as a keyboard 1108, a mouse 1110, and a display 1112.

Computer system 1100 may include functionality to execute various components of the present embodiments. In particular, computer system 1100 may include an operating system (not shown) that coordinates the use of hardware and software resources on computer system 1100, as well as one or more applications that perform specialized tasks for the user. To perform tasks for the user, applications may obtain the use of hardware resources on computer system 1100 from the operating system, as well as interact with the user through a hardware and/or software framework provided by the operating system.

In one or more embodiments, computer system 1100 provides a system for analyzing time-series performance data. The system may include a stateless-detection module that obtains time-series GC data collected during execution of a virtual machine in a computer system and generates one or more seasonal features from the time-series GC data. Next, the stateless-detection module may use a sequential-analysis technique to analyze the time-series GC data and the one or more seasonal features for an anomaly in the GC activity of the virtual machine. The stateless-detection module may then store an indication of a potential out-of-memory (OOM) event for the virtual machine based at least in part on identifying the anomaly in the GC activity of the virtual machine.

The system may also include a stateful-detection module. The stateful-detection module may obtain machine-generated time-series performance data collected during execution of a software program in a computer system and remove a subset of the machine-generated time-series performance data within an interval around one or more known anomalous events of the software program to generate filtered time-series performance data. Next, the stateful-detection module may use the filtered time-series performance data to build a statistical model of normal behavior in the software program and obtain a number of unique patterns learned by the statistical model. When the number of unique patterns satisfies a complexity threshold, but not when the number of unique patterns fails to satisfy the complexity threshold, the stateful-detection module may apply the statistical model to subsequent machine-generated time-series performance data from the software program to identify an anomaly in an activity of the software program. Finally, the stateful-detection module may store an indication of the anomaly for the software program based at least in part on identifying the anomaly in the activity of the software program.

The system may further include a trending module. The trending module may obtain time-series VM data including GC data collected during execution of a virtual machine in a computer system and compute a time window for analyzing the time-series VM data based at least in part on a working time scale of high-activity patterns in the time-series VM data. Next, the trending module may use a trend-estimation technique to analyze the time-series VM data within the time window to determine an out-of-memory (OOM) risk in the virtual machine. The trending module may then store an indication of the OOM risk for the virtual machine based at least in part on determining the OOM risk in the virtual machine.

In addition, one or more components of computer system 1100 may be remotely located and connected to the other components over a network. Portions of the present embodiments (e.g., computer system, virtual machine, signal-monitoring module, service processor, etc.) may also be located on different nodes of a distributed system that implements the embodiments. For example, the present embodiments may be implemented using a cloud computing system that monitors a set of remote virtual machines for anomalies and/or potential OOM events.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method of modifying memory allocations of virtual machines executing within a computing system, comprising:
    executing one or more virtual machines, including a first virtual machine, on a computing system, wherein each said virtual machine is allocated an amount of heap memory from the computer system,
    performing a plurality of garbage collection processes on the computing system during execution of the first virtual machine on the computer system;
    determining, by the computing system, using one or more processors of the computing system, one or more execution metrics for each of the plurality of garbage collection processes performed, the execution metrics including an execution duration for each of the plurality of garbage collection process,
    using a sequential-analysis technique to analyze, by the computing system, the execution metrics for each of the plurality of garbage collection processes for stateless detection of a memory usage trend for the first virtual machine, based on the execution durations for the plurality of garbage collection processes; and
    in response to detecting an upward memory usage trend for the first virtual machine based on the analysis of the execution durations for the plurality of garbage collection processes, modifying, by the computing system, the amount of heap memory allocated to the first virtual machine.

2. The method of claim 1, further comprising:
    dividing the execution metrics for each of the plurality of garbage collection processes into a training set and a test set; and
    validating the training set and the test set prior to analyzing the execution metrics the plurality of garbage collection processes.

3. The method of claim 2, wherein validating the training set and the test set comprises:
    using the training set to verify a minimum workload on the first virtual machine; and
    using the test set to verify a minimum level of garbage collection activity in the first virtual machine.

4. The method of claim 2, wherein the training set comprises a first subset of the execution metrics for the garbage collection processes that is collected prior to a second subset of the execution metrics for the garbage collection processes in the test set.

5. The method of claim 1, wherein analyzing the execution metrics for the garbage collection processes comprises determining one or more seasonal features for the execution metrics for the garbage collection processes of the first virtual machine comprises:
    using the one or more seasonal features to obtain a seasonal adjustment of the execution metrics for the plurality of garbage collection processes; and
    applying the sequential-analysis technique to the seasonal adjustment to test the detection of the upward memory usage trend for the first virtual machine.

6. The method of claim 1, wherein the execution metrics for each of the plurality of garbage collection processes performed further comprises:
    a heap size value after each of the plurality of garbage collection processes.

7. The method of claim 1, wherein the sequential-analysis technique comprises a sequential probability ratio test (SPRT).

8. The method of claim 1, further comprising transmitting an indication of a potential out-of-memory (OOM) event for the first virtual machine, in response to detecting an upward memory usage trend for the first virtual machine, wherein the indication is an alert that is transmitted to a recipient that is registered to monitor alerts for the first virtual machine.

9. The method of claim 1, wherein modifying the amount of heap memory allocated to the first virtual machine comprises restarting the execution of the first virtual machine on the computing system.

10. The method of claim 1, wherein modifying the amount of heap memory allocated to the first virtual machine comprises increasing the allocation of heap memory from the computing system to the first virtual machine.

11. The method of claim 1, wherein the execution metrics for each of the plurality of garbage collection processes performed further comprises a type of each of the plurality of garbage collection processes, and wherein the detection of the memory usage trend for the first virtual machine is based on (a) the execution durations for the plurality of garbage collection processes, and (b) the types of the plurality of garbage collection processes.

12. The method of claim 1, wherein the execution metrics for each of the plurality of garbage collection processes performed further comprises a type of each of the plurality of garbage collection processes and a heap size value after each of the plurality of garbage collection processes, and
    wherein the detection of the memory usage trend for the first virtual machine is based on (a) the execution durations for the plurality of garbage collection processes, and (b) the types of the plurality of garbage collection processes.

13. A computing system for modifying memory allocations of virtual machines executing within the computing system, comprising:
    one or more processors; and
    memory storing instructions that, when executed by the one or more processors, cause the computing system to:
        execute one or more virtual machines, including a first virtual machine, on the computing system, wherein each said virtual machine is allocated an amount of heap memory from the computer system;
        perform a plurality of garbage collection processes on the computing system during execution of the first virtual machine on the computer system;
        determine one or more execution metrics for each of the plurality of garbage collection processes performed, the execution metrics including an execution duration for each of the plurality of garbage collection process;
        use a sequential-analysis technique to analyze, by the computer system, the execution metrics for each of the plurality of garbage collection processes for stateless detection of a memory usage trend for the first virtual machine, based on the execution durations for the plurality of garbage collection processes; and in response to detecting an upward memory usage trend for the first virtual machine based on the analysis of the execution durations for the plurality of garbage collection processes, modify the amount of heap memory allocated to the first virtual machine.

14. The computing system of claim 13, wherein the memory further stores instructions that, when executed by the one or more processors, cause the computing system to:

divide the execution metrics for each of the plurality of garbage collection processes into a training set and a test set; and validate the training set and the test set prior to analyzing the execution metrics the plurality of garbage collection processes.

15. The computing system of claim 14, wherein validating the training set and the test set comprises:

using the training set to verify a minimum workload on the first virtual machine; and using the test set to verify a minimum level of garbage collection activity in the first virtual machine.

16. The computing system of claim 13, wherein analyzing the execution metrics for the garbage collection processes comprises determining one or more seasonal features for the execution metrics for the garbage collection processes of the first virtual machine comprises:

using the one or more seasonal features to obtain a seasonal adjustment of the execution metrics for the plurality of garbage collection processes; and applying the sequential-analysis technique to the seasonal adjustment to test the detection of the upward memory usage trend for the first virtual machine.

17. The computing system of claim 13, wherein the execution metrics for each of the plurality of garbage collection processes performed further comprises:

a heap size value after each of the plurality of garbage collection processes.

18. The computing system of claim 13, wherein the sequential-analysis technique comprises a sequential probability ratio test (SPRT).

19. A non-transitory computer-readable storage medium storing instructions that when executed by a computer system cause the computer system to modify memory allocations of virtual machines executing within the computing system by:

executing one or more virtual machines, including a first virtual machine, on the computing system, wherein each said virtual machine is allocated an amount of heap memory from the computer system;

performing a plurality of garbage collection processes on the computing system during execution of the first virtual machine on the computer system;

determining, by the computer system, one or more execution metrics for each of the plurality of garbage collection processes performed, the execution metrics including an execution duration for each of the plurality of garbage collection process, using a sequential-analysis technique to analyze the execution metrics for each of the plurality of garbage collection processes for stateless detection of a memory usage trend for the first virtual machine, based on the execution durations for the plurality of garbage collection processes; and in response to detecting an upward memory usage trend for the first virtual machine based on the analysis of the execution durations for the plurality of garbage collection processes, modify the amount of heap memory allocated to the first virtual machine.

20. The non-transitory computer-readable storage medium of claim 19, wherein analyzing the execution metrics for the garbage collection processes comprises determining one or more seasonal features for the execution metrics for the garbage collection processes of the first virtual machine comprises:

using the one or more seasonal features to obtain a seasonal adjustment of the execution metrics for the plurality of garbage collection processes; and applying the sequential-analysis technique to the seasonal adjustment to test the detection of the upward memory usage trend for the first virtual machine.

* * * * *

UNITED STATES PATENT AND TRADEMARK OFFICE
CERTIFICATE OF CORRECTION

PATENT NO. : 10,248,561 B2
APPLICATION NO. : 14/743817
DATED : April 2, 2019
INVENTOR(S) : Garvey et al.

Page 1 of 1

It is certified that error appears in the above-identified patent and that said Letters Patent is hereby corrected as shown below:

In the Claims

In Column 21, Line 20, in Claim 1, delete "system," and insert -- system; --, therefor.

Signed and Sealed this
Third Day of November, 2020

Andrei Iancu
*Director of the United States Patent and Trademark Office*